US012734800B2

(12) United States Patent
Nakagawa et al.

(10) Patent No.: US 12,734,800 B2
(45) Date of Patent: Sep. 15, 2026

(54) INK JET RECORDING METHOD AND INK JET RECORDING APPARATUS

(71) Applicant: CANON KABUSHIKI KAISHA, Tokyo (JP)

(72) Inventors: Kouhei Nakagawa, Tokyo (JP); Takashi Saito, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 149 days.

(21) Appl. No.: 18/740,083

(22) Filed: Jun. 11, 2024

(65) Prior Publication Data

US 2024/0408866 A1 Dec. 12, 2024

(30) Foreign Application Priority Data

Jun. 12, 2023 (JP) ................................ 2023-096386
May 15, 2024 (JP) ................................ 2024-079384

(51) Int. Cl.
*B41J 2/045* (2006.01)
*B41J 2/15* (2006.01)
(Continued)

(52) U.S. Cl.
CPC ............... *B41J 2/0458* (2013.01); *B41J 2/15* (2013.01); *B41J 2/16535* (2013.01);
(Continued)

(58) Field of Classification Search
CPC ........ B41J 2/0458; B41J 2/15; B41J 2/16535; B41J 2/04563; B41J 2/045; B41J 2/1404; C09D 11/326; C09D 11/38
See application file for complete search history.

(56) References Cited

U.S. PATENT DOCUMENTS 7,705,071 B2 4/2010 Nakagawa et al.
7,854,798 B2 12/2010 Udagawa et al.
(Continued)

FOREIGN PATENT DOCUMENTS

JP 2017-124608 A 7/2017
WO WO-2017067614 A1 * 4/2017 ............ B41J 20/454

OTHER PUBLICATIONS

Alavarez et al., “Printhead Recovery” (WO 2017/067614 A1), Apr. 2, 20177, [Paragraphs 0022-0023] (Year: 2017).*
(Continued)

*Primary Examiner* — Lisa Solomon
(74) *Attorney, Agent, or Firm* — Venable LLP

(57) ABSTRACT

Provided is an ink jet recording method in which a high-quality image having a ruled line shift suppressed can be recorded with a circulation serial head and in which a change in color tone of an image due to ink color mixing can be suppressed even at the time of long-term use. The ink jet recording method includes recording an image by ejecting an ink from a recording head including: a plurality of ejection orifices. The plurality of ejection orifice arrays includes a first ejection orifice array configured to eject a first ink and a second ejection orifice array configured to eject a second ink on an upstream side and on a downstream side, respectively, with respect to a flow direction of the ink. A static surface tension $\gamma s_1$ of the first ink and a static surface tension $\gamma s_2$ of the second ink satisfy a relationship of $\gamma s_1 \geq \gamma s_2$.

10 Claims, 10 Drawing Sheets

(51) Int. Cl.
*B41J 2/165* (2006.01)
*C09D 11/326* (2014.01)
*C09D 11/38* (2014.01)

(52) U.S. Cl.
CPC ............ *C09D 11/326* (2013.01); *C09D 11/38* (2013.01); *B41J 2/04563* (2013.01)

(56) References Cited

U.S. PATENT DOCUMENTS

| | | | | |
|---|---|---|---|---|
| 7,918,928 | B2 | 4/2011 | Saito et al. | |
| 8,871,013 | B2 | 10/2014 | Sakai et al. | |
| 8,876,962 | B2 | 11/2014 | Yamamoto et al. | |
| 8,932,394 | B2 | 1/2015 | Kudo et al. | |
| 8,986,435 | B2 | 3/2015 | Saito et al. | |
| 8,992,674 | B2 | 3/2015 | Ikegami et al. | |
| 9,388,322 | B2 | 7/2016 | Kakikawa et al. | |
| 9,453,138 | B2 | 9/2016 | Shimizu et al. | |
| 9,598,592 | B2 | 3/2017 | Nakata et al. | |
| 9,605,170 | B2 * | 3/2017 | Nakagawa | C09D 11/102 |
| 9,895,901 | B2 | 2/2018 | Saito et al. | |
| 9,957,399 | B2 | 5/2018 | Okazaki et al. | |
| 10,240,053 | B2 | 3/2019 | Nushiro et al. | |
| 10,280,326 | B2 | 5/2019 | Saito et al. | |
| 10,479,082 | B2 | 11/2019 | Nakagawa et al. | |
| 10,562,305 | B2 | 2/2020 | Saito et al. | |
| 10,563,076 | B2 | 2/2020 | Saito et al. | |
| 10,603,909 | B2 | 3/2020 | Kawabe et al. | |
| 10,723,135 | B2 | 7/2020 | Kawabe et al. | |
| 10,843,482 | B2 | 11/2020 | Aikawa et al. | |
| 10,843,483 | B2 | 11/2020 | Saito et al. | |
| 10,864,747 | B2 | 12/2020 | Nakagawa et al. | |
| 11,654,693 | B2 | 5/2023 | Saito et al. | |
| 11,827,033 | B2 | 11/2023 | Yamashita et al. | |
| 11,833,838 | B2 | 12/2023 | Motomura et al. | |
| 2004/0165033 | A1 * | 8/2004 | Chikuma | B41J 2/04551 347/41 |

OTHER PUBLICATIONS

Quantifying Acrylic Resin Glass Transition Temperature Shifts, retrieved on Dec. 2, 20254, [Paragraph 2] (Year: 2025).*

* cited by examiner

FORWARD DIRECTION

SCANNING DIRECTION OF RECORDING HEAD

BACKWARD DIRECTION

FORWARD DIRECTION

SCANNING DIRECTION OF RECORDING HEAD

INK JET RECORDING METHOD AND INK JET RECORDING APPARATUS

BACKGROUND OF THE INVENTION

Field of the Invention

The present invention relates to an ink jet recording method and an ink jet recording apparatus.

Description of the Related Art

With an ink jet recording method, images, such as photographs and documents, can be recorded on various recording mediums. In addition, there have been proposed various inks in accordance with applications, such as an ink suitable for recording an image of photographic quality on glossy paper and an ink suitable for recording a document or the like on plain paper.

In recent years, the ink jet recording method has been utilized in the case of recording a business document including a character and a diagram on a recording medium such as plain paper, and the frequency of utilization in such applications has been remarkably increased. Moreover, the ink jet recording method has been required to be capable of recording the document at a higher speed than ever before. In addition, there is also a strong need for downsizing of an ink jet recording apparatus because of, for example, limitations on its installation place.

As the type of a recording head of the ink jet recording apparatus, there are two kinds: a serial type and a line type. From the viewpoint of downsizing, a recording head of a serial type (serial head) is advantageous. In order to increase a recording speed through use of the serial head, the following measures are considered necessary. For example, an increase in scanning speed of the recording head is required. In addition, it is required to reduce the frequency of a so-called preliminary ejection operation, which is one kind of recovery treatment performed during scanning of the recording head. Further, it is required to perform single pass recording in which a plurality of inks is applied to a unit region by single relative scanning between the recording head and a recording medium. In addition, it is required to reduce the frequency of a recovery operation for suppressing a decrease in ejection property caused by a thickened material of an ink, a bubble or the like. That is, as a problem when using a serial head, there is a compatibility between recording speed and high image quality.

When an image is recorded by single pass recording involving applying a plurality of inks to a recording medium by one-time recording head scanning, a difference in ejection amount between ejection orifices is liable to influence image quality as compared to multi-pass recording. When there is a difference in ejection frequency between ejection orifices, an ejection property is liable to be decreased owing to thickening of an ink at the ejection orifice having low ejection frequency. When the frequency of the preliminary ejection operation for preventing the foregoing is reduced, a decrease in ejection amount becomes more significant. In addition, when there is a difference in temperature between the ejection orifices in the recording head owing to the difference in use frequency between the ejection orifices and the environment surrounding the recording head, a difference in viscosity of an ink occurs, and a fluctuation in ejection amount in association therewith also occurs. Both of these occurrences cause the ejection amount to be varied between the ejection orifices, resulting in a shift due to a variation in dot position particularly in ruled lines recorded by single pass.

As a method of improving the ejection stability of an ink while reducing the frequency of the preliminary ejection operation, for example, there has been proposed a liquid ejection head capable of suppressing retention of a solid content in a liquid in the vicinity of the periphery of the ejection orifice even after the ejection operation is paused for a predetermined time period (Japanese Patent Application Laid-Open No. 2017-124608).

SUMMARY OF THE INVENTION

In order to achieve both an increase in recording speed and downsizing of a recording apparatus, the inventors of the present invention have made investigations on recording an image by single pass through use of a recording head of a serial type adopting a mechanism for flowing an ink in the vicinity of an ejection orifice (circulation serial head), which has been proposed in Japanese Patent Application Laid-Open No. 2017-124608. As a result, even after an ejection operation was paused for a predetermined time period, the ejection stability of the ink was improved, and the frequency of the preliminary ejection operation performed during scanning of the recording head was able to be reduced.

In addition, in order to simultaneously achieve an increase in recording speed and downsizing of a recording apparatus, and an increase in image quality, the inventors of the present invention have investigated the recording of an image by single pass through adoption of a mechanism (ink warming mechanism) for warming an ink in the above-mentioned circulation serial head, and as a result, have found the following. The ink warming mechanism reduces a difference in viscosity of an ink due to the difference in temperature between the ejection orifices and suppresses a fluctuation in ejection amount in association therewith. Thus, a variation in ejection amount is suppressed, and a high-quality image having a ruled line shift suppressed can be recorded. However, it has been found that, when an image is recorded for a long time period, a change in color tone of an image due to ink color mixing may occur in the recorded image.

Accordingly, an object of the present invention is to provide an ink jet recording method in which a high-quality image having a ruled line shift suppressed can be recorded with a circulation serial head and in which a change in color tone of an image due to ink color mixing can be suppressed even at the time of long-term use. In addition, another object of the present invention is to provide an ink jet recording apparatus to be used in the ink jet recording method.

That is, according to the present invention, there is provided an ink jet recording method including recording an image by ejecting an ink from a recording head including: a plurality of ejection orifices each configured to eject the ink; an ejection element configured to generate energy for ejecting the ink; and a first flow path and a second flow path which communicate to each other between each of the plurality of ejection orifices and the ejection element and inside which the ink flows, the ink jet recording method including: an ejection step of ejecting the ink from the plurality of ejection orifices; a flow step, which is separate from the ejection step, of flowing the ink in the first flow path into the second flow path; and a step of warming the ink in the recording head, wherein the recording head is a recording head of a serial type which includes an ejection element substrate including a plurality of ejection orifice arrays each having the plurality of ejection orifices arranged in a predetermined direction and which is scanned in a direction intersecting with an arrangement direction of the ejection orifice arrays, wherein the first flow path and the second flow path are arranged in parallel to a scanning direction of the recording head and have the same flow direction of the ink, wherein the plurality of ejection orifice arrays include a first ejection orifice array configured to eject a first ink and a second ejection orifice array configured to eject a second ink, and the first ejection orifice array and the second ejection orifice array are arranged on an upstream side and on a downstream side, respectively, with respect to the flow direction of the ink, and wherein a static surface tension $\gamma s_1$ of the first ink and a static surface tension $\gamma s_2$ of the second ink satisfy a relationship of $\gamma s_1 \geq \gamma s_2$.

According to the present invention, the ink jet recording method in which a high-quality image having a ruled line shift suppressed can be recorded with a circulation serial head and in which a change in color tone of an image due to ink color mixing can be suppressed even at the time of long-term use can be provided. In addition, according to the present invention, the ink jet recording apparatus to be used in the ink jet recording method can be provided.

Further features of the present invention will become apparent from the following description of exemplary embodiments with reference to the attached drawings.

DESCRIPTION OF THE EMBODIMENTS

The present invention is described in more detail below by way of exemplary embodiments. In the present invention, when a compound is a salt, the salt is present in a state of dissociating into ions in an ink, but the expression "contains the salt" is used for convenience. In addition, an aqueous ink for ink jet is sometimes simply described as "ink". A first flow path and a second flow path are sometimes collectively described as "flow path". Similarly, a first ink and a second ink are sometimes collectively described as "ink". A secondary color ruled line recorded with two inks is sometimes simply described as "ruled line". Physical property values are values at normal temperature (25° C.) unless otherwise stated.

<Ink Jet Recording Method and Ink Jet Recording Apparatus>

An ink jet recording apparatus of the present invention includes a recording head including: a plurality of ejection orifices each configured to eject the ink; an ejection element configured to generate energy for ejecting the ink; and a first flow path and a second flow path which communicate to each other between each of the plurality of ejection orifices and the ejection element and inside which the ink flows. The recording head is a recording head of a serial type (serial head) which includes an ejection element substrate including a plurality of ejection orifice arrays each having the plurality of ejection orifices arranged in a predetermined direction and which is scanned in a direction intersecting with an arrangement direction of the ejection orifice arrays. The ink jet recording apparatus of the present invention further includes: a flow unit, which is separate from the ejection element, configured to flow the ink in the first flow path into the second flow path; and a mechanism configured to warm the ink in the recording head. In addition, an ink jet recording method of the present invention is, for example, a method including using the above-mentioned ink jet recording apparatus and recording an image by ejecting an ink from the above-mentioned recording head. That is, the ink jet recording method of the present invention includes: an ejection step of ejecting the ink from the plurality of ejection orifices; a flow step, which is separate from the ejection step, of flowing the ink in the first flow path into the second flow path; and a step of warming the ink in the recording head.

Figure 1:
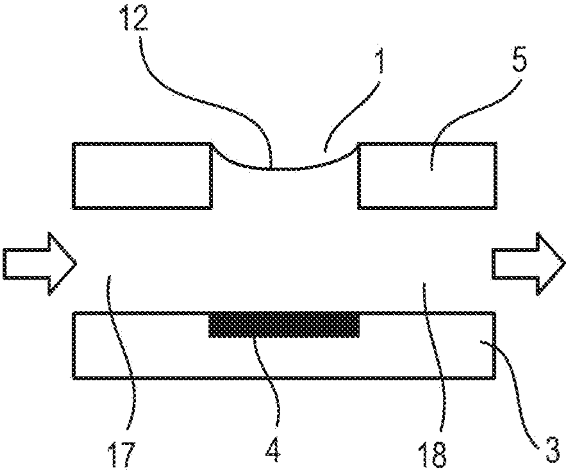
FIG. 1 is a schematic view for illustrating the state of the vicinity of an ejection orifice of a recording head.

FIG. 1 is a schematic view for illustrating the state of the vicinity of the ejection orifice of the recording head. The recording head illustrated in FIG. 1 includes: an ejection orifice 1 configured to eject an ink; an ejection element 4 configured to generate energy for ejecting the ink; and a first flow path 17 and a second flow path 18 which communicate to each other between the ejection orifice 1 and the ejection element 4 and inside which the ink flows. As described later in the description of an ejection element substrate of the recording head, the ejection orifice 1 is formed on an ejection orifice forming member 5, and the ejection element 4 is arranged on a substrate 3. The ink passes between the ejection orifice 1 and the ejection element 4 and flows from the first flow path 17 into the second flow path 18 (in a direction indicated by the arrow of FIG. 1). When the ink does not flow, evaporation of water from a meniscus 12 of the ink in the ejection orifice 1 proceeds, and along with this, the ink present between the ejection orifice 1 and the ejection element 4 is gradually thickened. Accordingly, when an ejection pause time is long, the ink may be hardly ejected owing to an increase in its fluid resistance at the time of the next ejection operation. Meanwhile, when the ink flows in the direction indicated by the arrow of FIG. 1, even in the case where water evaporates from the meniscus 12, the ink is successively supplied between the ejection orifice 1 and the ejection element 4 through a circulation flow, and hence the thickening of the ink is suppressed, with the result that the occurrence of a state in which the ink is hardly ejected can be prevented.

With the configuration of the ink jet recording method using the recording head of a serial type (circulation serial head) that causes a circulation flow described above, even when there is a difference in ejection frequency between the ejection orifices, a variation in ejection amount can be suppressed without performance of recovery through a preliminary ejection operation.

In addition, the ink jet recording apparatus of the present invention includes a mechanism configured to warm the ink in the recording head (ink warming mechanism). The ink jet recording method of the present invention includes a step of warming (warming step) the ink in the recording head, for example, by using the ink jet recording apparatus including the ink warming mechanism. The warming of the ink in the recording head may be adjusted, for example, by a unit configured to control the temperature of the recording head. Examples of the unit configured to control the temperature of the recording head may include: a heater for temperature adjustment arranged so as to be in direct contact with the recording head; and a heater for ink ejection. When the temperature of the recording head is controlled (heated or warmed) by the heater for ink ejection, for example, a current to the extent that the ink is prevented from being ejected may be repeatedly applied. The temperatures of the recording head and the ink in the recording head may be read, for example, with a temperature sensor provided in the recording head. The temperature of the ink in the recording head is preferably adjusted within the range of 40° C. or more to 60° C. or less. The variation in ejection amount can be suppressed by uniformizing the temperatures of the ejection orifices with the warming unit.

Figure 2:
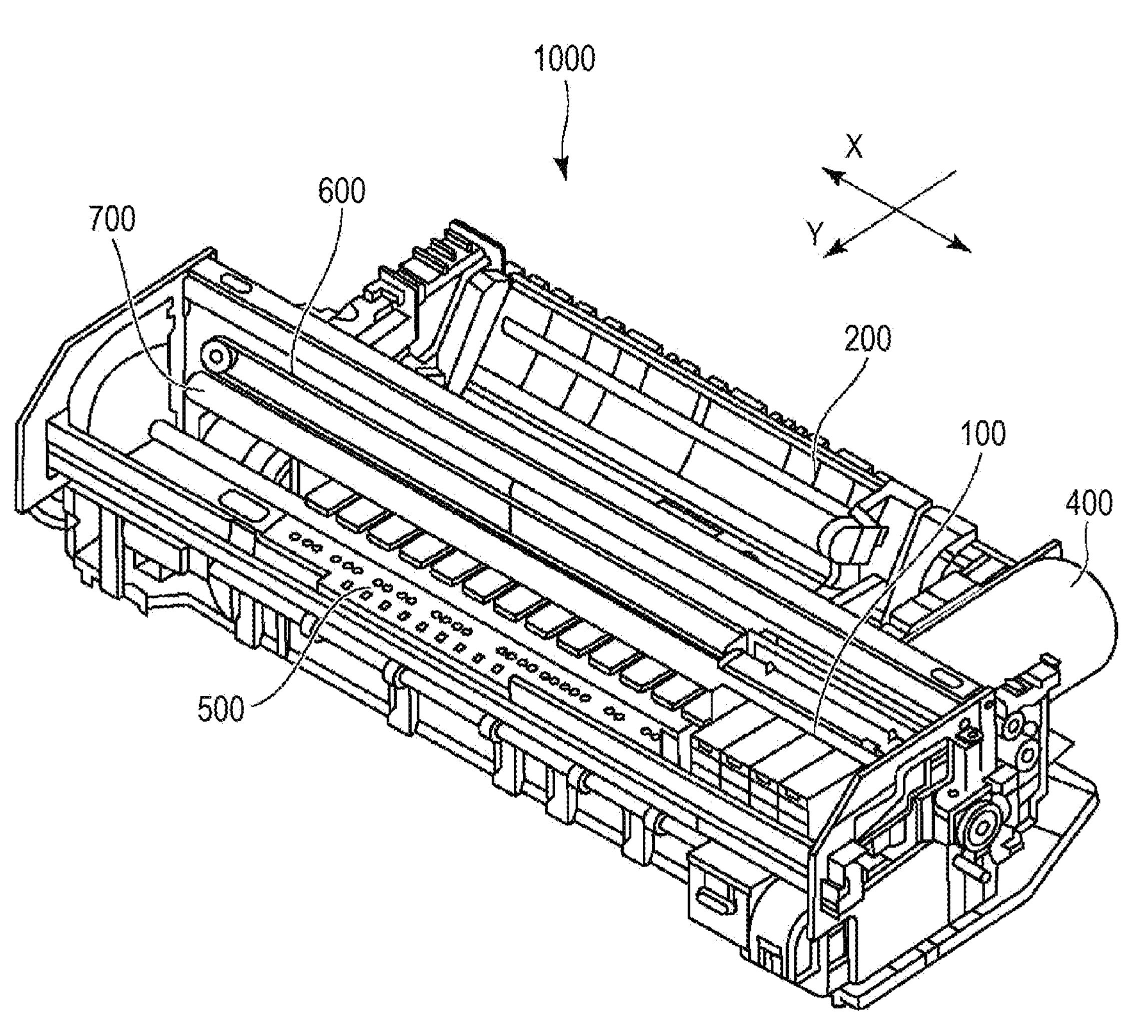
FIG. 2 is a perspective view for schematically illustrating an ink jet recording apparatus according to one embodiment.

The ink jet recording apparatus having the circulation serial head mounted thereon is described. FIG. 2 is a perspective view for schematically illustrating an ink jet recording apparatus 1000 according to one embodiment. A plurality of recording mediums can be loaded into a feed unit 200, and the recording mediums are each fed by a feed roller (not shown). A recording medium P (see FIG. 3A and FIG. 3B) of this embodiment is described by taking as an example a cut sheet having been cut into a predetermined size, but the present invention is not limited thereto and may also be adopted in a mode of recording on a roll sheet.

Figure 3A:
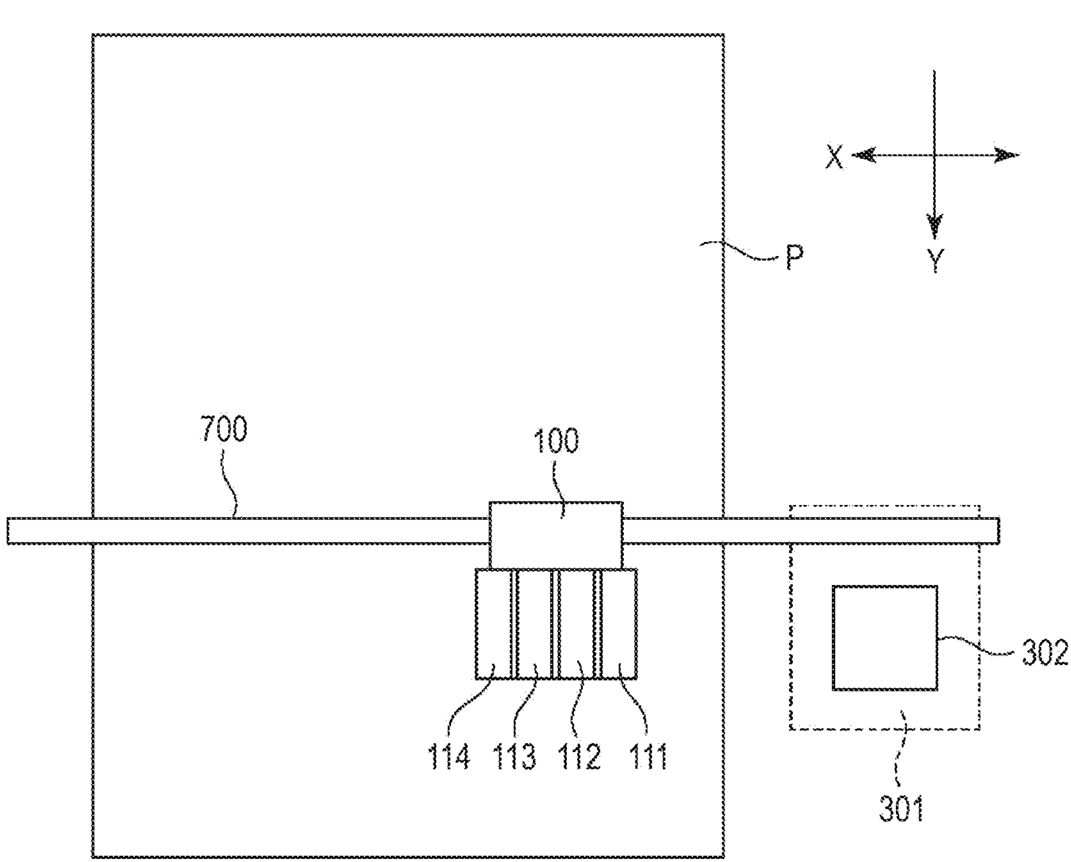
FIG. 3A and FIG. 3B are each a schematic view for illustrating the internal configuration of the ink jet recording apparatus.
Figure 3B:
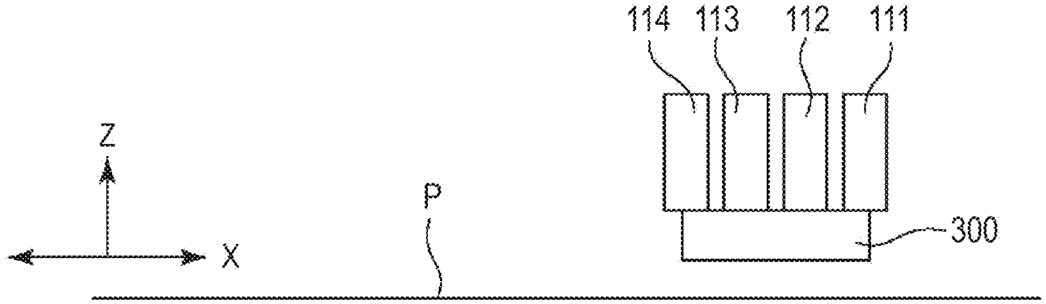

The recording medium fed by the feed unit 200 is conveyed in a Y direction (conveying direction) by a conveying unit including a conveying roller (not shown), and is moved to a recording position opposite to an ejection unit (recording head) 300 configured to eject an ink (see FIG. 3B). A carriage 100 has the ejection unit (recording head) 300 mounted thereon, and is reciprocally scanned in an X direction (main scanning direction) intersecting with the Y direction along a guide shaft 700 through a timing belt 600 by the driving of a carriage motor 400.

After an image is recorded on a unit area through the movement of the carriage 100 in the X direction and an ink ejection operation by the ejection unit (recording head) 300, the recording medium is conveyed in the Y direction by the conveying unit. The unit area may be arbitrarily set to, for example, "one band" that can be recorded by the arrangement width of the ejection orifice arrays arranged along the Y direction in the ejection unit 300 and one movement of the ejection unit 300 in the X direction, or "one" pixel corresponding to the resolution of the recording head. With the recording head of a serial type, an image can be recorded on the entire recording medium through a recording operation in which an ink ejection operation of one band and an intermittent conveying operation are repeated. In this embodiment, the X direction and the Y direction are orthogonal to each other.

In addition, a platen 500 configured to support the recording medium from a vertically downward direction is arranged in a recording region which is located at a position opposite to the ejection unit (recording head) 300 and in which recording is performed by the ejection unit (recording head) 300. With the platen 500, a recording surface of the recording medium and an ejection orifice surface 2 (FIG. 6) of the ejection unit (recording head) 300 having arranged therein the ejection orifices each configured to eject an ink are kept at a predetermined distance.

FIG. 3A and FIG. 3B are each a schematic view for illustrating the internal configuration of the ink jet recording apparatus 1000 according to one embodiment of the present invention. FIG. 3A is a schematic top view of the recording apparatus 1000 when seen from above, and FIG. 3B is a schematic side view of the recording apparatus 1000 when seen from front. The carriage 100 has detachably mounted thereon an ink cartridge configured to store an ink to be supplied to the ejection unit (recording head) 300. A plurality of ink cartridges 111, 112, 113 and 114 correspond to ejection orifice arrays 21, 22, 23 and 24 (see FIG. 4), respectively, and are configured to supply an ink to the respective ejection orifice arrays. For example, ejection orifice arrays and ink cartridges corresponding to respective colors of cyan, magenta, yellow and black (CMYK) are arranged.

In addition, a cap 302 for capping the ejection orifice surface 2 of the ejection unit (recording head) 300 is arranged within the movement region of the carriage 100 and outside the region (recording region) through which the recording medium P passes. The position of the carriage 100 (the ejection unit (recording head) 300) at which the ejection orifice surface 2 of the ejection unit (recording head) 300 faces the cap 302 is also referred to as "home position 301". The cap 302 is connected to a suction unit (not shown), and when the suction unit is driven under a state in which the ejection orifice surface 2 is capped, the ink is sucked from the ejection unit (recording head) 300.

Figure 4:
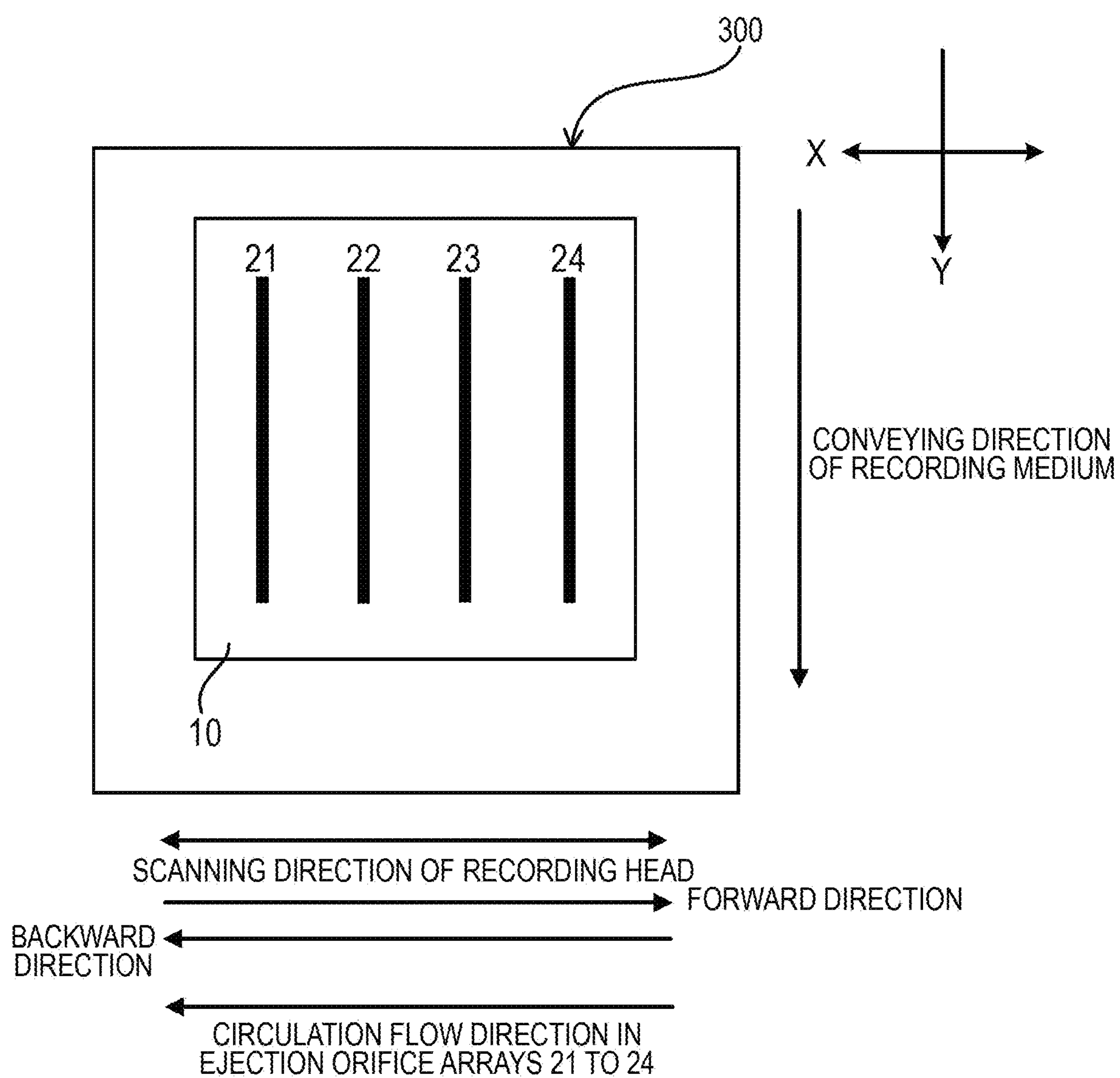
FIG. 4 is a schematic view for illustrating an arrangement example of ejection orifice arrays in a recording head and a circulation flow direction example of an ink.

FIG. 4 is a schematic view for illustrating an arrangement example of the ejection orifice arrays in the ejection unit (recording head) 300 and an example of a circulation flow direction, which is the flow direction of an ink. A state in which the ejection unit (recording head) 300 illustrated in FIG. 3B is seen from a recording medium P side is illustrated in FIG. 4. As illustrated in FIG. 4, the ejection unit (recording head) 300 is a recording head of a serial type that includes an ejection element substrate 10 including the four ejection orifice arrays 21, 22, 23 and 24, and is scanned in the X direction intersecting with the arrangement direction of the ejection orifice arrays 21 to 24. In addition, all the four ejection orifice arrays 21 to 24 have the same circulation flow direction from right to left, which is parallel to the X direction (scanning direction). The ejection unit (recording head) 300 is reciprocally moved in a forward direction from left to right and in a backward direction from right to left. Accordingly, the scanning direction and the circulation flow direction are the same direction at the time of the backward direction and reverse directions at the time of the forward direction.

As described above, in the image recorded by single pass through the step of warming the ink in the head with the serial head that flows the ink, fluctuations in ejection amount due to the differences in ejection frequency and temperature between the ejection orifices can be suppressed without performance of the recovery operation through the preliminary ejection. However, it has been found that even with the above-mentioned configuration, a change in color tone of an image due to ink color mixing may occur at the time of long-term use. The inventors of the present invention have presumed this phenomenon to be as described below.

Figure 5A:
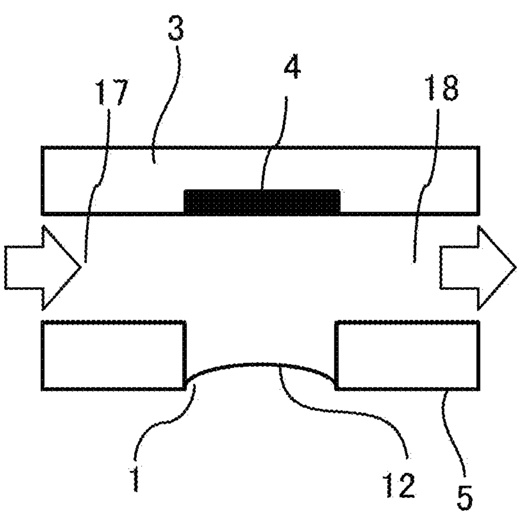
FIG. 5A and FIG. 5B are each a schematic view for illustrating the state of the ink in the recording head at the time of scanning of the recording head.
Figure 5B:
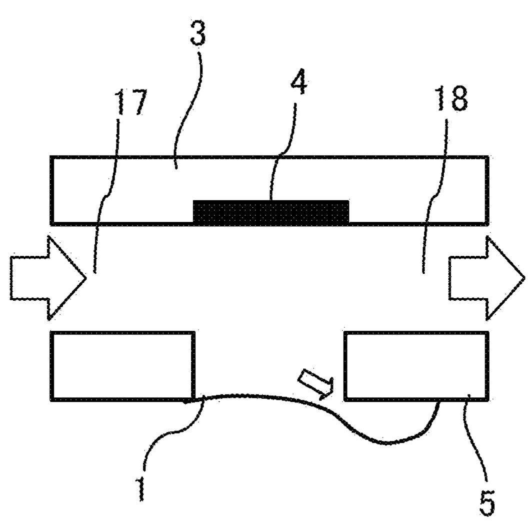
Figure 5B:
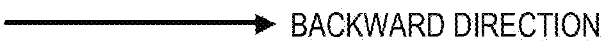

FIG. 5A and FIG. 5B are each a schematic view for illustrating the flow state of an ink in the recording head during scanning of the recording head. When recording is started through use of the circulation serial head, while the recording head is scanned in the forward direction from the home position, is switched from the forward direction to the backward direction, and is scanned on the recording medium, the meniscus 12 in the ejection orifice 1 is stable as illustrated in FIG. 5A. After that, immediately after the recording head is switched from the backward direction to the forward direction, that is, when the recording head is instantaneously stopped in the vicinity of the home position, it is conceived that an inertial force acts on the ink in the vicinity of the ejection orifice 1 in the same direction as that of the circulation flow. In this case, it is conceived that there occurs a phenomenon in which the meniscus at the ejection orifice 1 is broken by the inertial force and the ink overflows on the downstream side of the circulation flow as illustrated in FIG. 5B. After that, the overflowing ink is quickly drawn into the ejection orifice 1 in a short time period.

However, when the ink is warmed, the overflow is liable to occur because the meniscus is easily fluctuated through the decrease in viscosity of the ink. In addition, components such as a coloring material are liable to be precipitated at a site in which the overflow has occurred because the drying of the ink is accelerated. Thus, in the ink jet recording method including the flow step and the warming step of the ink, which uses the circulation serial head, it is conceived that components such as a coloring material are liable to be precipitated on the circulation flow downstream side of the ejection orifice. It is conceived that the ink is liable to further remain in a portion in which the components such as a coloring material have been precipitated, and the precipitation of the components such as a coloring material by drying is accelerated, with the result that the overflow range of the ink expands. After the long-term use, the overflow range of the ink reaches the ejection orifice array positioned on the downstream side with respect to the flow direction of the ink from the ejection orifice array positioned on the upstream side with respect thereto, and the color mixing of the ink ejected from the ejection orifice array on the upstream side occurs with respect to the ink ejected from the ejection orifice array on the downstream side. It is presumed that the color-mixed ink on the upstream side is retained in the meniscus at the ejection orifice 1 or the periphery thereof, or continuously enters a flow path from the ejection orifice array on the downstream side through the circulation flow, to thereby cause a change in color tone.

As used herein, of the plurality of ejection orifice arrays in the recording head, the ink ejection orifice array on the upstream side with respect to the flow direction of the ink is sometimes described as "first ejection orifice array", and the ink ejected from the first ejection orifice array is sometimes described as "first ink". In addition, the ink ejection orifice array on the downstream side with respect to the flow direction of the ink is sometimes described as "second ejection orifice array", and the ink ejected from the second ejection orifice array is sometimes described as "second ink". The "upstream side" and "downstream side" with respect to the flow direction of the ink in the plurality of ejection orifice arrays mean a relative relationship between two ejection orifice arrays to be compared.

The inventors of the present invention have focused on the flow direction of the ink and a relationship between the static surface tensions of the inks ejected from the two ejection orifice arrays in order to suppress the change in color tone of an image due to ink color mixing at the time of long-term use described above. In the ink color mixing, the ink having a relatively low static surface tension is likely to enter the ink having a relatively high static surface tension. Thus, a static surface tension $\gamma s_1$ of the first ink ejected from the first ejection orifice array arranged on the upstream side with respect to the flow direction of the ink and a static surface tension $\gamma s_2$ of the second ink ejected from the second ejection orifice array arranged on the downstream side with respect thereto are set to the relationship of $\gamma s_1 \geq \gamma s_2$. In the case where the relationship of $\gamma s_1 \geq \gamma s_2$ is satisfied, when the first ink of the first ejection orifice array overflowing from the upstream side is brought into contact with the second ink in the vicinity of the second ejection orifice array and inside the ink flow path, the mixing of the first ink of the first ejection orifice array into the second ink of the second ejection orifice array can be suppressed. The foregoing reduces a change in color tone of an image and makes the color mixing less noticeable, and hence can suppress a change in color tone of an image due to ink color mixing.

Figure 6:
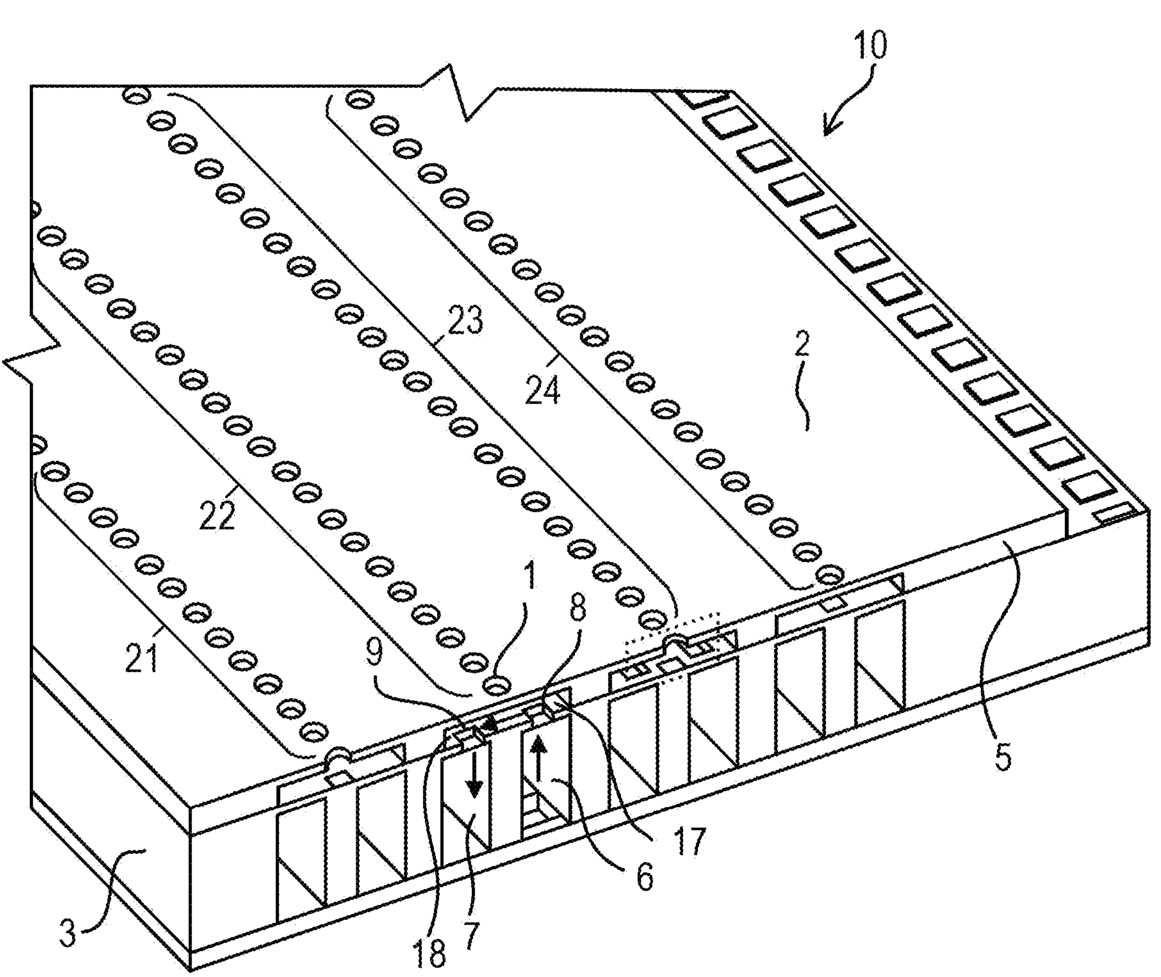
FIG. 6 is a perspective view for illustrating a cross-section of an ejection element substrate.
Figure 7:
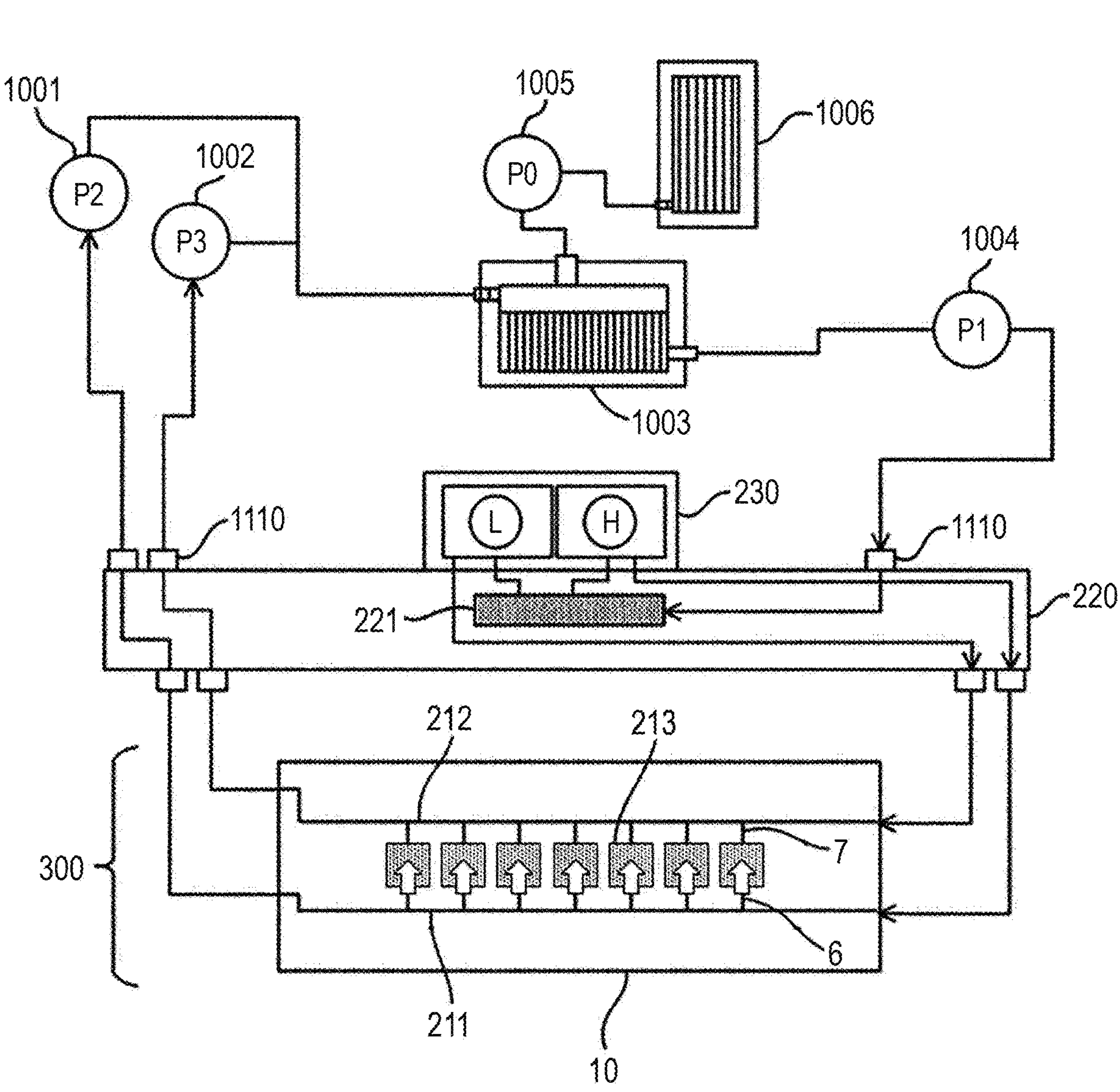
FIG. 7 is a schematic view for illustrating a supply system of the ink.

FIG. 6 is a perspective view for illustrating a cross-section of the ejection element substrate. As illustrated in FIG. 6, the ejection element substrate 10 includes: the ejection orifice forming member 5 having formed therein the ejection orifices 1; and the substrate 3 having arranged thereon an ejection element (not shown). The lamination of the ejection orifice forming member 5 and the substrate 3 forms the first flow path 17 and the second flow path 18 through which the ink flows. The first flow path 17 is a region from an inflow port 8, into which the ink in an inflow path 6 flows, to a portion between each of the ejection orifices 1 and the ejection element (FIG. 7, a liquid chamber 213). In addition, the second flow path 18 is a region from the portion between the ejection orifice 1 and the ejection element (FIG. 7, the liquid chamber 213) to an outflow port 9 from which the ink flows out to an outflow path 7. For example, when a pressure difference is made between the inflow port 8 and the outflow port 9 like the inflow port 8 having a high pressure and the outflow port 9 having a low pressure, the ink can be flowed from the high pressure to the low pressure (in a direction indicated by the arrows in FIG. 6). The ink that has passed the inflow path 6 and the inflow port 8 enters the first flow path 17. Then, the ink that has passed through the portion between the ejection orifice 1 and the ejection element (FIG. 7, the liquid chamber 213) passes through the second flow path 18 and the outflow port 9 and flows into the outflow path 7.

The flow step of flowing the ink in the first flow path into the second flow path is a step separate from (a step different from) the ejection step of ejecting the ink from the ejection orifice. In addition, the flowing of the ink from the first flow path into the second flow path in the flow step is preferably performed separately from the loading of the ink between the ejection orifice and the ejection element. The flow step is preferably a step of flowing the ink in the first flow path into the second flow path without discharging the ink from the ejection orifice. The discharge of the ink from the ejection orifice includes a recovery operation, such as preliminary ejection or suction. During the recovery operation of the recording head, the flowing of the ink from the first flow path into the second flow path may be stopped. Further, in the flow step, the ink is preferably flowed from the first flow path into the second flow path by the flow unit, which is separate from the ejection element.

Further details about the ink jet recording method and ink jet recording apparatus of the present invention are described below by taking as an example a recording head of a thermal system configured to eject an ink by generating air bubbles through utilization of an ejection element configured to generate thermal energy. However, even a recording head of a piezo system or a recording head adopting any other ejection system can be applied to the ink jet recording method and ink jet recording apparatus of the present invention. Herein, the description is made by taking as an example a mode of circulating an ink between an ink storage portion and the recording head, but any other mode may be adopted. For example, the following mode may be adopted: two ink storage portions are arranged on the upstream side and downstream side of the recording head, and an ink is flowed from one of the ink storage portions to the other ink storage portion. Further, the description is made by taking as an example a recording head having incorporated therein an ejection element substrate in which four ejection orifice arrays capable of ejecting inks of four colors of CMYK are arranged, but a recording head including ejection orifice arrays capable of ejecting two or more kinds of inks may be used. In the present invention, a recording head configured to eject an ink by a thermal system is particularly preferably used.

In the flow step, it is preferable that the ink be continuously flowed or intermittently flowed. Details about a method of continuously flowing the ink and a method of intermittently flowing the ink are described below. First, with reference to FIG. 7, the method of continuously flowing the ink is described. FIG. 7 is a schematic view for illustrating an ink supply system. The ejection unit (recording head) 300 illustrated in FIG. 7 is connected to a first circulation pump (high-pressure side) 1001, a first circulation pump (low-pressure side) 1002, a sub tank 1003, a second circulation pump 1004 and the like. For simplification of the description, only a flow path for an ink of one color is illustrated in FIG. 7, but in actuality, flow paths for four colors of CMYK are each arranged in the ejection unit (recording head) 300.

The sub tank 1003 connected to a main tank 1006 serving as an ink storage portion has an air communication port (not shown) and hence can discharge air bubbles mixed into an ink to the outside. The sub tank 1003 is also connected to a replenishment pump 1005. The ink is consumed in the ejection unit (recording head) 300 by the ejection (discharge) of the ink from the ejection orifice in, for example, image recording or suction recovery. The replenishment pump 1005 transfers the ink corresponding to the consumed amount from the main tank 1006 to the sub tank 1003.

The first circulation pump (high-pressure side) 1001 and the first circulation pump (low-pressure side) 1002 each flow the ink in the ejection unit (recording head) 300 that has been flowed out of a connection portion 1110 to the sub tank 1003. A positive-displacement pump having a quantitative liquid-delivering ability is preferably used as each of the first circulation pump (high-pressure side) 1001 and the first circulation pump (low-pressure side) 1002. Specific examples of such positive-displacement pump may include a tube pump, a gear pump, a diaphragm pump and a syringe pump. At the time of the driving of each of the ejection unit 300, the ink can be flowed into a common inflow path 211 and a common outflow path 212 by the first circulation pump (high-pressure side) 1001 and the first circulation pump (low-pressure side) 1002.

A negative pressure control unit 230 includes two pressure adjusting mechanisms in which control pressures different from each other are set. A pressure adjusting mechanism (high-pressure side) H and a pressure adjusting mechanism (low-pressure side) L are connected to the common inflow path 211 and the common outflow path 212 in the ejection unit 300 via a supply unit 220 having arranged therein a filter 221 that removes foreign matter from an ink, respectively.

The supply unit 220 and the ejection unit (recording head) 300 are connected to each other via an ink supply tube (not shown) serving as an ink supply path. The ejection unit (recording head) 300 is subjected to reciprocal scanning in the ink jet recording apparatus, and hence the ink supply tube is formed of a resin material having such flexibility as to be capable of withstanding the reciprocal scanning.

The ejection unit 300 has arranged therein the common inflow path 211, the common outflow path 212, and the inflow path 6 and the outflow path 7 that communicate to the liquid chamber 213 serving as a portion between each of the ejection orifices 1 and the ejection element (not shown). The inflow path 6 and the outflow path 7 communicate to the common inflow path 211 and the common outflow path 212. Accordingly, a flow (arrow in FIG. 7) in which part of the ink passes the inside of the liquid chamber 213 from the common inflow path 211 to flow into the common outflow path 212 occurs. The arrows in FIG. 6 indicate the flow of the ink in the liquid chamber 213. That is, as illustrated in FIG. 6, the ink in the first flow path 17 flows into the second flow path 18 via a space between the ejection orifice 1 and the ejection element.

As illustrated in FIG. 7, a pressure adjusting mechanism H is connected to the common inflow path 211 and a pressure adjusting mechanism L is connected to the common outflow path 212. Accordingly, a pressure difference occurs between the inflow path 6 and the outflow path 7. Thus, a pressure difference also occurs between the inflow port 8 (FIG. 6) communicating to the inflow path 6 and the outflow port 9 (FIG. 6) communicating to the outflow path 7. When the ink is flowed by the pressure difference between the inflow port and the outflow port, the flow speed (mm/s) of the ink at the time of the flowing is preferably controlled to 1.0 mm/s or more to 100.0 mm/s or less. When the flow speed of the ink is 1.0 mm/s or more, an increase in viscosity of the ink in the vicinity of the ejection orifice is suppressed at the time when an ejection operation is paused for a predetermined time period, and hence the ejection stability of the ink is easily improved, with the result that a ruled line shift is more easily suppressed. Meanwhile, when the flow speed of the ink is 100.0 mm/s or less, the stability of the meniscus in the ejection orifice is easily improved, and hence the occurrence of overflow of the ink from the ejection orifice due to the inertial force is easily suppressed, with the result that a change in color tone of an image at the time of long-term use is more easily suppressed.

In the ink jet recording method of the present invention, the ink in the first flow path may be flowed into the second flow path even during a recovery operation of the recording head. When the ink flows during the recovery operation of the recording head, the ink constantly flows. When the ink constantly flows, water is liable to evaporate, and hence the concentration of the circulating ink is liable to be increased. In order to suppress an increase in concentration of the ink, it is preferable that a mechanism for adding water to the ink by the elapse of a predetermined time period be arranged in the ink jet recording apparatus. Further, it is preferable that a detector for detecting the concentration of the ink be arranged in the ink jet recording apparatus, and water be added to the ink in conjunction with an increase in concentration of the ink having been detected.

Figure 8A:
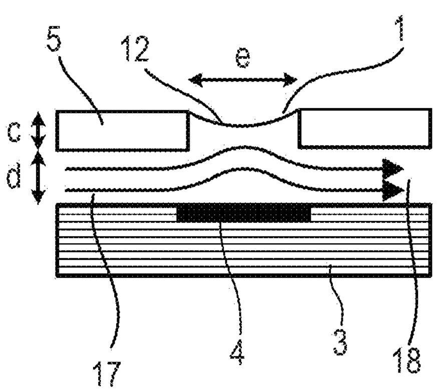
FIG. 8A and FIG. 8B are each a schematic view for illustrating the flow state of the ink in the vicinity of the ejection orifice.
Figure 8B:
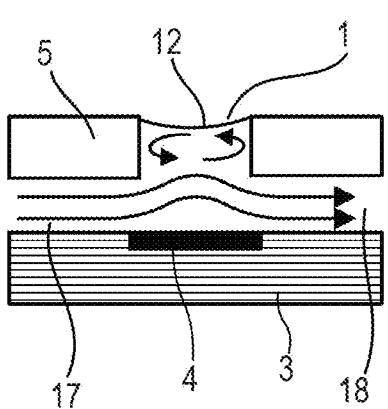

FIG. 8A and FIG. 8B are each a schematic view for illustrating the flow state of an ink in the vicinity of the ejection orifice. The flow state of the ink in the vicinity of the ejection orifice is roughly divided into two kinds: the first one is such a flow state as illustrated in FIG. 8A in which no circulation flow occurs in the vicinity of the meniscus 12 in the ejection orifice 1; and the second one is such a flow state as illustrated in FIG. 8B in which a circulation flow occurs in the vicinity of the meniscus 12 in the ejection orifice 1. Even when the flow speed of the ink in the flow path is comparable, the flow state of the ink in the vicinity of the meniscus 12 may not be constant. It is conceived that which flow state the ink is in depends on a thickness (c) of the ejection orifice forming member 5, a height (d) of the flow path (each of the first flow path 17 and the second flow path 18) and a diameter (e) of the ejection orifice 1, rather than the flow speed of the ink in the flow path. For example, when the height (d) of the flow path and the diameter (e) of the ejection orifice 1 are comparable to each other, in the case where the thickness (c) of the ejection orifice forming member 5 is large, the circulation flow is likely to occur in the vicinity of the meniscus 12 as illustrated in FIG. 8B.

Figure 9:
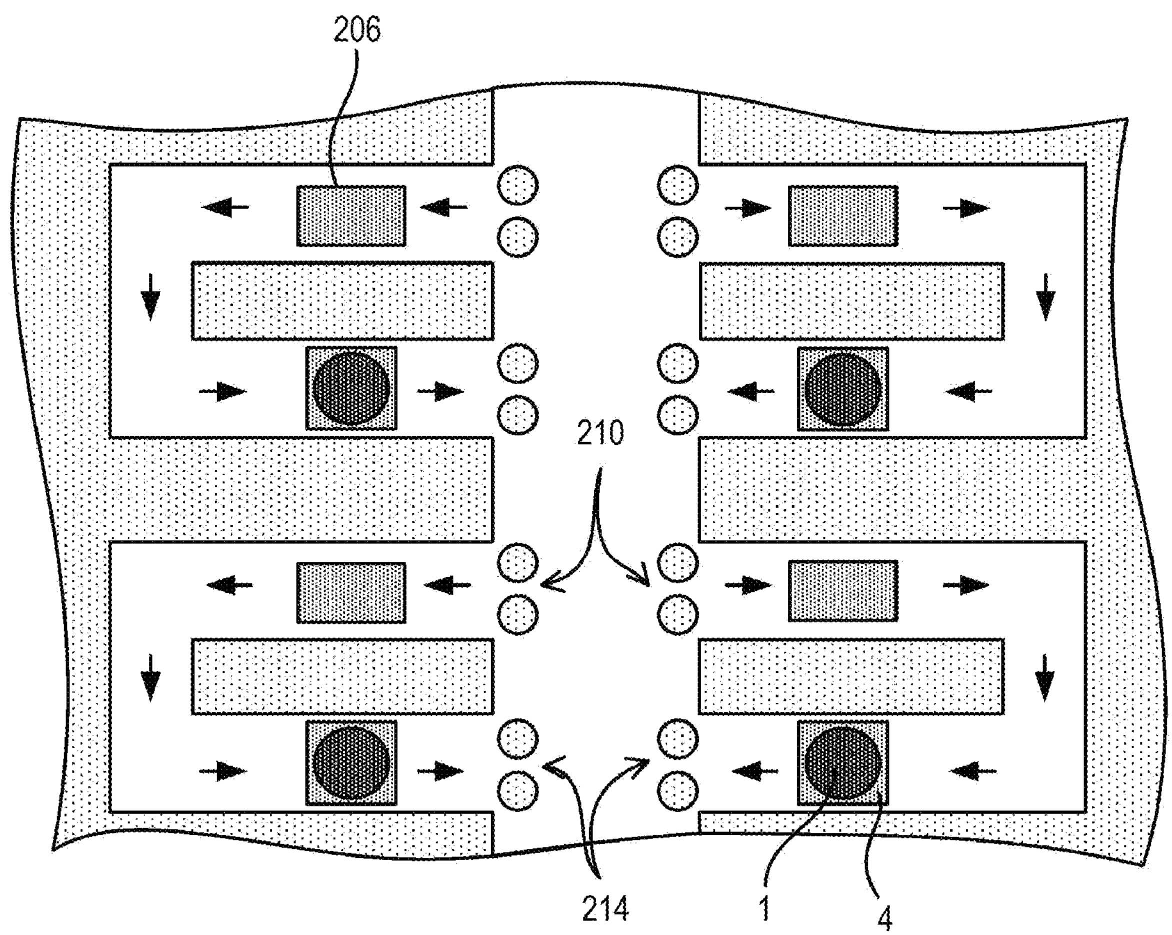
FIG. 9 is a sectional view for partially illustrating an example of the recording head.

Next, with reference to FIG. 9, the method of intermittently flowing the ink is described. FIG. 9 is a sectional view for partially illustrating an example of the recording head. As illustrated in FIG. 9, the ink, which has flowed in from an inflow port 210, flows in a direction indicated by the arrow by the action of a circulation pump 206 serving as a unit for flowing the ink, and flows out from an outflow port 214. In addition, the circulation pump 206 is a pump capable of intermittently flowing the ink. Accordingly, the ink can be intermittently flowed between the ejection orifice 1 and the ejection element 4 by driving the circulation pump 206.

In the ink jet recording method of the present invention, the scanning speed of the recording head during recording of an image, that is, the moving speed of the recording head during scanning may be set to preferably 30 inches/sec or more, more preferably 35 inches/sec or more from the viewpoint of an increase in recording speed. In addition, the moving speed of the recording head during scanning is preferably set to 70 inches/sec or less. When the moving speed of the recording head during scanning is set to 70 inches/sec or less, an inertial force generated when the recording head stops is suppressed, and thus the ink hardly overflows from the ejection orifice. As a result, a change in color tone of an image at the time of long-term use is more easily suppressed.

In the recording head to be used in the ink jet recording method of the present invention, a distance between the first ejection orifice array and the second ejection orifice array may be set to 1.8 mm or less. Any other ejection orifice array may be arranged between the first ejection orifice array and the second ejection orifice array, or the first ejection orifice array and the second ejection orifice array may be adjacent to each other. When the distance between the ejection orifice arrays is short, the ejection orifice arrays can be arranged densely, and hence downsizing and an increase in image quality are easily achieved, but the color mixing of the ink is liable to occur. In the case where the distance between the first ejection orifice array and the second ejection orifice array is set to 1.8 mm or less, when the static surface tension $\gamma s_1$ of the first ink and the static surface tension $\gamma s_2$ of the second ink satisfy the relationship of $\gamma s_1 \geq \gamma s_2$, a change in color tone of an image due to ink color mixing can be suppressed even at the time of long-term use. The distance between the first ejection orifice array and the second ejection orifice array may be set to preferably 0.1 mm or more, more preferably 0.5 mm or more.

The ink jet recording method of the present invention includes a step of recording an image with the above-mentioned ink jet recording apparatus (recording step). In the recording step, specifically, the image is recorded by applying the inks ejected from the ejection orifices of the recording head to the recording medium. Any medium may be used as the recording medium on which the image is to be recorded. Of such mediums, such sheets of paper each having permeability as described below are preferably used: a recording medium free of any coating layer, such as plain paper or uncoated paper; and a recording medium including a coating layer, such as glossy paper or art paper.

The ink jet recording method of the present invention may be free of a step of heating the recording medium to which the ink has been applied through the recording step (heating step). It is conceived that, when the recording medium to which the ink has been applied is heated, a temperature in a main body of the apparatus is increased along with the heating step, and evaporation of water from the meniscus in the recording head is liable to proceed. Thus, the above-mentioned heating step may not be performed so that a change in color tone due to ink color mixing is easily suppressed even at the time of long-term use by reducing an influence from an increase in temperature.

(Cleaning Step)

It is preferable that the ink jet recording method of the present invention further include a cleaning step of wiping the ejection orifice surface in which the plurality of ejection orifice arrays of the recording head is arranged in a predetermined direction. The cleaning step may be performed, for example, with an ink jet recording apparatus including a cleaning unit that wipes the ejection orifice surface. A method for the wiping method is, for example, a method involving wiping the ejection orifice surface by bringing a wiper member made of an elastic member such as a rubber into abutment against the ejection orifice surface and moving the wiper member or a method involving pressing an absorbent member such as a nonwoven fabric against the ejection orifice surface to cause the nonwoven fabric to absorb an ink. In the present invention, it is preferable that the system of the wiping be one of a system involving moving the wiper member in a direction parallel to the arrangement direction of the ejection orifice arrays or a system involving pressing a nonwoven fabric against the ejection orifice surface to cause the nonwoven fabric to absorb an ink. When the wiping is performed by such system, the overflow of an ink and the precipitated coloring material between the adjacent ejection orifice arrays can be efficiently removed, and a change in color tone of an image due to color mixing can be suppressed even at the time of long-term use.

<Ink>

The ink jet recording method of the present invention includes a step of recording an image, through use of a plurality of inks, by applying the inks ejected from the ejection orifices of the recording head to a recording medium. The plurality of inks (ink set) includes the first ink to be ejected from an ejection orifice array (first ejection orifice array) arranged on an upstream side with respect to the flow direction of each of the inks and the second ink to be ejected from an ejection orifice array (second ejection orifice array) arranged on a downstream side with respect thereto. In addition, the static surface tension $\gamma s_1$ of the first ink and the static surface tension $\gamma s_2$ of the second ink satisfy the relationship of $\gamma s_1 \geq \gamma s_2$.

The static surface tension of the ink may be appropriately controlled by adjusting the kind and amount of a surfactant or a water-soluble organic solvent described later to be incorporated into the ink. The static surface tension of the ink may be adjusted by using the surfactant and the water-soluble organic solvent in combination. The static surface tension of the ink may be measured by a plate method using a platinum plate. In Examples described later, the static surface tension of the ink was measured with an automatic surface tension meter (product name "Model CBVP-Z", manufactured by Kyowa Interface Science Co., Ltd.).

Within the range in which the static surface tension $\gamma s_1$ of the first ink and the static surface tension $\gamma s_2$ of the second ink satisfy the relationship of $\gamma s_1 \geq \gamma s_2$, the values of $\gamma s_1$ and $\gamma s_2$ are each preferably 24 mN/m or more to 42 mN/m or less. A difference in static surface tension between the first ink and the second ink, ($\gamma s_1$-$\gamma s_2$), is preferably 3 mN/m or less, more preferably 2 mN/m or less, and is 0 mN/m or more.

Constituent components of each of the first ink and the second ink and the physical properties of each of the inks are described in detail below.

(Coloring Material)

A pigment or a dye may be used as the coloring material to be incorporated into the ink. Of those, a pigment is preferable. The content (% by mass) of the coloring material in the ink is preferably 0.10% by mass or more to 15.00% by mass or less, more preferably 0.30% by mass or more to 10.00% by mass or less with respect to the total mass of the ink.

Specific examples of the pigment may include: inorganic pigments, such as carbon black and titanium oxide; and organic pigments, such as azo, phthalocyanine, quinacridone, isoindolinone, imidazolone, diketopyrrolopyrrole and dioxazine pigments. Of those, carbon black and organic pigments are preferable.

A resin-dispersed pigment using a resin as a dispersant, a self-dispersible pigment, which has a hydrophilic group bonded to its particle surface, or the like may be used as a dispersion system for the pigment. In addition, a resin-bonded pigment having a resin-containing organic group chemically bonded to its particle surface, a microcapsule pigment, which contains a particle whose surface is covered with, for example, a resin, or the like may be used. Of those, a resin-dispersed pigment is more preferable from the viewpoint of an ejection property.

A dispersant that can disperse the pigment in an aqueous medium through the action of an anionic group is preferably used as a resin dispersant for dispersing the pigment in the aqueous medium. Such a resin as described later, in particular, a water-soluble resin may be used as the resin dispersant. The mass ratio of the content (% by mass) of the pigment in the ink to the content of the resin dispersant therein is preferably 0.3 times or more to 10.0 times or less.

A pigment having an anionic group, such as a carboxylic acid group, a sulfonic acid group or a phosphonic acid group, bonded to its particle surface directly or through any other atomic group (—R—) may be used as the self-dispersible pigment. The anionic group may be any of acid type and salt type anionic groups. In the case of the salt type anionic group, the group may be in any of a state in which part of the group dissociates or a state in which the entirety thereof dissociates. In the case of the salt type anionic group, a cation serving as a counterion may be, for example, an alkali metal cation, ammonium or an organic ammonium. Specific examples of the other atomic group (—R—) may include: a linear or branched alkylene group having 1 to 12 carbon atoms; an arylene group, such as a phenylene group or a naphthylene group; a carbonyl group; an imino group; an amide group; a sulfonyl group; an ester group; and an ether group. In addition, groups obtained by combining those groups may be adopted.

A dye having an anionic group is preferably used as the dye. Specific examples of the dye may include dyes, such as azo, triphenylmethane, (aza) phthalocyanine, xanthene and anthrapyridone dyes.

(Resin)

A resin may be incorporated into the ink. The content (% by mass) of the resin in the ink is preferably 0.10% by mass or more to 20.00% by mass or less, more preferably 0.50% by mass or more to 15.00% by mass or less with respect to the total mass of the ink.

The resin may be added to the ink (i) for stabilizing the dispersed state of the pigment, that is, as a resin dispersant or an aid therefor. In addition, the resin may be added to the ink (ii) for improving the various characteristics of an image to be recorded. Examples of the form of the resin may include a block copolymer, a random copolymer, a graft copolymer and a combination thereof. In addition, the resin may be a water-soluble resin that can be dissolved in an aqueous medium or may be a resin particle to be dispersed in the aqueous medium. The resin particle does not need to include any coloring material. When the resin is used as a dispersant for dispersing the pigment, any other resin is preferably further incorporated into the ink in addition to the resin serving as a dispersant.

The phrase "resin is water-soluble" as used herein means that when the resin is neutralized with an alkali in an equimolar amount to its acid value, the resin is present in an aqueous medium under a state in which the resin does not form any particle whose particle diameter may be measured by a dynamic light scattering method. Whether or not a resin is water-soluble may be determined in accordance with a method described below. First, a liquid (resin solid content: 10% by mass) containing a resin neutralized with an alkali (e.g., sodium hydroxide or potassium hydroxide) equivalent to its acid value is prepared. Next, the prepared liquid is diluted 10-fold (based on a volume) with pure water to prepare a sample solution. Then, when the particle diameter of the resin in the sample solution is measured by a dynamic light scattering method, and a particle having a particle diameter is not measured, the resin may be determined to be water-soluble. Measurement conditions in this case may be set, for example, as described below.

[Measurement Conditions]

SetZero: 30 seconds

Number of times of measurement: three times

Measurement time: 180 seconds

A particle size analyzer based on a dynamic light scattering method (e.g., product name "UPA-EX150", manufactured by Nikkiso Co., Ltd.) or the like may be used as a particle size distribution-measuring apparatus. The particle size distribution-measuring apparatus to be used, the measurement conditions and the like are of course not limited to the foregoing.

The acid value of the water-soluble resin is preferably 100 mgKOH/g or more to 250 mgKOH/g or less. The acid value of the resin for forming the resin particle is preferably 5 mgKOH/g or more to 100 mgKOH/g or less. As used herein, the acid value of the resin may be a value measured by a potentiometric titrator using a potassium hydroxide-methanol titrant. The weight-average molecular weight of the water-soluble resin is preferably 3,000 or more to 15,000 or less. The weight-average molecular weight of the resin for forming the resin particle is preferably 1,000 or more to 2,000,000 or less. As used herein, the weight average molecular weight of the resin can be measured as a polystyrene equivalent value measured by gel permeation chromatography (GPC). The volume-average particle diameter of the resin particle to be measured by a dynamic light scattering method is preferably 100 nm or more to 500 nm or less.

Examples of the resin may include an acrylic resin, a urethane-based resin and an olefin-based resin. Of those, an acrylic resin and a urethane-based resin are preferable.

Resins each having a hydrophilic unit and a hydrophobic unit as its constituent units are each preferable as the acrylic resin. Of those, a resin having a hydrophilic unit derived from (meth)acrylic acid and a hydrophobic unit derived from at least one of a monomer having an aromatic ring or a (meth)acrylic acid ester-based monomer is preferable. A resin having a hydrophilic unit derived from (meth)acrylic acid and a hydrophobic unit derived from at least one monomer of styrene or α-methylstyrene is particularly preferable. Those resins may each be suitably utilized as a resin dispersant for dispersing the pigment because the resins each easily cause an interaction with the pigment.

The hydrophilic unit is a unit having a hydrophilic group such as an anionic group. The hydrophilic unit may be formed by, for example, polymerizing a hydrophilic monomer having a hydrophilic group. Specific examples of the hydrophilic monomer having a hydrophilic group may include: acidic monomers each having a carboxylic acid group, such as (meth)acrylic acid, itaconic acid, maleic acid and fumaric acid; and anionic monomers, such as anhydrides and salts of those acidic monomers. A cation for forming the salt of the acidic monomer may be, for example, an ion of lithium, sodium, potassium, ammonium or an organic ammonium. The hydrophobic unit is a unit free of a hydrophilic group such as an anionic group. The hydrophobic unit may be formed by, for example, polymerizing a hydrophobic monomer free of a hydrophilic group such as anionic group. Specific examples of the hydrophobic monomer may include: monomers each having an aromatic ring, such as styrene, α-methylstyrene and benzyl (meth)acrylate; and (meth)acrylic acid ester-based monomers, such as methyl (meth)acrylate, butyl (meth)acrylate and 2-ethylhexyl (meth)acrylate.

The urethane-based resin may be obtained by, for example, causing a polyisocyanate and a component reacting therewith (a polyol or a polyamine) to react with each other. In addition, a crosslinking agent or a chain extender may be further caused to react with the reaction product.

The polyisocyanate is a compound having two or more isocyanate groups in a molecular structure thereof. An aliphatic polyisocyanate, an aromatic polyisocyanate or the like may be used as the polyisocyanate. Specific examples of the aliphatic polyisocyanate may include: polyisocyanates each having a chain structure, such as tetramethylene diisocyanate, hexamethylene diisocyanate, dodecamethylene diisocyanate, 2,2,4-trimethylhexamethylene diisocyanate, 2,4,4-trimethylhexamethylene diisocyanate, lysine diisocyanate, 2-methylpentane-1,5-diisocyanate and 3-methylpentane-1,5-diisocyanate; and polyisocyanates each having a cyclic structure, such as isophorone diisocyanate, hydrogenated xylylene diisocyanate, 4,4'-dicyclohexylmethane diisocyanate, 1,4-cyclohexane diisocyanate, methylcyclohexylene diisocyanate and 1,3-bis(isocyanatomethyl) cyclohexane.

Specific examples of the aromatic polyisocyanate may include tolylene diisocyanate, 2,2'-diphenylmethane diisocyanate, 2,4'-diphenylmethane diisocyanate, 4,4'-diphenylmethane diisocyanate, 4,4'-dibenzyl diisocyanate, 1,5-naphthylene diisocyanate, xylylene diisocyanate, 1,3-phenylene diisocyanate, 1,4-phenylene diisocyanate, a dialkyldiphenylmethane diisocyanate, a tetraalkyl diphenylmethane diisocyanate and α,α,α',α'-tetramethylxylylene diisocyanate.

A polyol may be used as a component that becomes a unit for forming a urethane resin by a reaction with the above-mentioned polyisocyanate. The "polyol" as used herein means a compound having two or more hydroxy groups in a molecule thereof. Specific examples thereof may include: a polyol having no acid group, such as polyether polyol, polyester polyol or polycarbonate polyol; and a polyol having an acid group.

Examples of the polyol having no acid group may include long-chain polyols each having a number-average molecular weight of about 450 to about 4,000, such as polyether polyol, polyester polyol and polycarbonate polyol.

Examples of the polyol having an acid group may include polyols each having an acid group, such as a carboxylic acid group, a sulfonic acid group or a phosphonic acid group, in a structure thereof. In particular, it is preferable to use a water-soluble urethane resin synthesized by further using a polyol having an acid group, such as dimethylol propionic acid or dimethylol butanoic acid, in addition to the polyol having no acid group. The acid group may be in the form of a salt. A cation for forming the salt may be, for example, an ion of lithium, sodium, potassium, ammonium or an organic ammonium. When the water-soluble urethane resin has an acid group, the acid group is typically neutralized by a neutralizing agent, such as a hydroxide of an alkali metal (e.g., lithium, sodium or potassium) or ammonia water, and thus the urethane resin exhibits water solublity.

Examples of the polyamine may include: monoamines each having a plurality of hydroxy groups, such as dimethylolethylamine, diethanolmethylamine, dipropanolethylamine and dibutanolmethylamine; difunctional polyamines, such as ethylenediamine, propylenediamine, hexylenediamine, isophoronediamine, xylylenediamine, diphenylmethanediamine, hydrogenated diphenylmethanediamine and hydrazine; and trifunctional or higher polyamines, such as diethylenetriamine, triethylenetetramine, tetraethylenepentamine, a polyamide polyamine and a polyethylene polyimine. A compound having a plurality of hydroxy groups and one "amino group or imino group" was also given as an example of the "polyamine" for convenience.

At the time of the synthesis of the urethane resin, a crosslinking agent or a chain extender may be used. Typically, the crosslinking agent is used at the time of the synthesis of a prepolymer and the chain extender is used when the prepolymer synthesized in advance is subjected to a chain-extending reaction. Basically, a product appropriately selected from, for example, water, a polyisocyanate, a polyol and a polyamine may be used as the crosslinking agent or the chain extender in accordance with purposes, such as crosslinking and chain extension. An extender that can crosslink the urethane resin may be used as the chain extender.

Examples of the olefin-based resin may include α-olefin polymers, such as polyethylene and polypropylene. The α-olefin polymer has an α-olefin unit, such as an ethylene unit or a propylene unit, as a main constituent unit. The α-olefin polymer may be an ethylene homopolymer or a propylene homopolymer, or may be a copolymer of α-olefins, such as ethylene, propylene, 1-butene, 1-pentene, 1-hexene and 4-methyl-1-pentene. Examples of the copolymer may include a random copolymer, a block copolymer, a graft copolymer and a combination of those copolymers.

[Resin Particle]

The ink preferably contains a resin particle. In the present invention, an ink containing a resin particle having a glass transition temperature Tg higher than the warming temperature of the recording head as the resin particle is preferably used. In particular, it is more preferable that the first ink contains the resin particle having a glass transition temperature Tg higher than the warming temperature of the recording head. The resin particle can suppress a change in color tone of an image due to ink color mixing by alleviating the aggregation of coloring materials to suppress the precipitation thereof onto the ejection orifice surface at the time of drying of the ink. Examples of the resin particle include an acrylic resin particle, an olefin-based resin particle and a urethane-based resin particle. The glass transition temperature of the resin particle may be measured for the resin particle itself with a thermal analysis device such as a differential scanning calorimeter (DSC).

[Water-Soluble Urethane Resin]

The ink preferably contains a water-soluble urethane resin. Of the water-soluble resins, the water-soluble urethane resin rapidly exhibits an interaction in the vicinity of the meniscus and forms a stable molecular film. Accordingly, when the ink containing the water-soluble urethane resin is used, the occurrence of overflow of the ink from the ejection orifice due to an inertial force is easily suppressed, with the result that a change in color tone of an image at the time of long-term use is easily suppressed.

[Block Copolymer]

The ink preferably contains a block copolymer. The block copolymer typically has a structure in which a plurality of blocks derived from monomers of the same kind or having similar properties are arranged. A block copolymer to be generally used in an aqueous ink for ink jet has such a structure as described below. There are given, for example: an AB block structure having a hydrophobic block (A block) and an ionic hydrophilic block (B block); and an ABC block structure in which a nonionic hydrophilic block (C block) is further added to the AB block structure. That is, the block copolymer has a structure in which the hydrophilic block and the hydrophobic block are each localized, and hence has high surface activity and is rapidly oriented in the vicinity of the meniscus. Accordingly, when the ink containing the block copolymer is used, the meniscus is stabilized, and thus the occurrence of overflow of the ink from the ejection orifice due to an inertial force is easily suppressed, with the result that a change in color tone of an image at the time of long-term use is easily suppressed.

The block copolymer may be synthesized by a general synthesis method, such as an anion living polymerization method, a cation living polymerization method, a group transfer polymerization method, an atom transfer radical polymerization method or a reversible addition-fragmentation chain transfer polymerization method. The block copolymer is preferably the water-soluble resin instead of the resin particle.

(Surfactant)

The ink preferably contains a surfactant. The surfactant is oriented to a gas-liquid interface so that its hydrophobic group faces an atmospheric side and its hydrophilic group faces an ink side, and hence the meniscus can be further stabilized. Examples of the surfactant may include an anionic surfactant, a nonionic surfactant, a cationic surfactant and an amphoteric surfactant. Of those, a nonionic surfactant is preferably used from the viewpoint of the reliability of the ink.

Examples of the nonionic surfactant may include: a hydrocarbon-based surfactant, such as an ethylene oxide adduct of acetylene glycol or a polyoxyethylene alkyl ether; a fluorine-based surfactant such as a perfluoroalkyl ethylene oxide adduct; and a silicone-based surfactant such as a polyether-modified siloxane compound. Of those, a hydrocarbon-based surfactant is preferable and an ethylene oxide adduct of acetylene glycol is more preferable.

Of the ethylene oxide adducts of acetylene glycol, a compound represented by the following general formula (1) is particularly preferably used. The first ink preferably contains the compound represented by the following general formula (1). The second ink may also contain the compound represented by the following general formula (1):

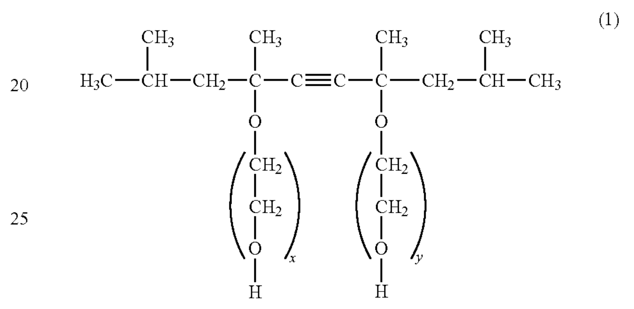

(1)

in the general formula (1), "x" and "y" each independently represent a number of 0 or more, and x+y is 0 or more to 50 or less.

The compound represented by the general formula (1) has a high orientation speed to an interface. Thus, when the ink is dried, the compound can be quickly oriented to adsorb to the coloring material, to thereby suppress the precipitation of the coloring material, and hence the change in color tone of an image due to ink color mixing can be suppressed at the time of long-term use. In the general formula (1), "x" and "y" each independently represent a number of 0 or more, preferably 1 or more. In addition, in the general formula (1), x+y is 0 or more to 50 or less, preferably 1 or more to 50 or less, more preferably 1.3 or more to 10 or less. The content (% by mass) of the compound represented by the general formula (1) in the ink is preferably 0.05% by mass or more to 5.00% by mass or less, more preferably 0.10% by mass or more to 3.00% by mass or less with respect to the total mass of the ink.

(Aqueous Medium)

The ink to be used in the ink jet recording method of the present invention is preferably an aqueous ink containing at least water as an aqueous medium. An aqueous medium that is water or a mixed solvent of water and a water-soluble organic solvent may be incorporated into the ink. Deionized water or ion-exchanged water is preferably used as the water. The content (% by mass) of the water in the aqueous ink is preferably 50.00% by mass or more to 95.00% by mass or less with respect to the total mass of the ink. In addition, the content (% by mass) of the water-soluble organic solvent in the aqueous ink is preferably 3.00% by mass or more to 48.00% by mass or less with respect to the total mass of the ink. Solvents that may each be used in an ink for ink jet, such as alcohols, (poly)alkylene glycols, glycol ethers, nitrogen-containing compounds and sulfur-containing compounds, may each be used as the water-soluble organic solvent.

(Other Additives)

The ink may contain, in addition to the above-mentioned components, various additives, such as a defoaming agent, another surfactant, a pH adjustor, a viscosity adjustor, a rust inhibitor, an antiseptic agent, a fungicide, an antioxidant and a reduction inhibitor, as required.

(Lightness)

In the ink to be used in the ink jet recording method and ink jet recording apparatus of the present invention, it is preferable that the first ink have lightness higher than that of the second ink. The ink color mixing is more noticeable when an ink having low lightness out of the two kinds of inks enters an ink having high lightness and is less noticeable when the ink having high lightness enters the ink having low lightness. Thus, of the inks to be ejected from the two adjacent ejection orifice arrays, the first ink of the first ejection orifice array positioned on the upstream side with respect to the ink flow direction is preferably set to have lightness higher than the lightness of the second ink of the second ejection orifice array positioned on the downstream side. With this configuration, even when color mixing occurs, the ink having high lightness enters the ink having low lightness. Thus, the change in color tone of an image can be reduced to make the color mixing less noticeable, and the change in color tone of an image due to ink color mixing can be further suppressed.

The relationship of lightness between inks may be grasped by measuring the lightness of an ink, which has been diluted with water by an appropriate factor so as to achieve an absorbance value suitable for measurement, with a spectrophotometer, but the relationship of lightness between inks may be changed depending on the content of the coloring material in each of the inks. When the lightnesses of a plurality of inks are compared to each other, it is required that the plurality of inks be diluted with water by the same factor.

The first ink and the second ink may have different hues or the same hue, and any combination of hues may be used. In particular, it is preferable that the first ink and the second ink have different hues. When the hues are different, the high-low order of the lightnesses of basic colors for aqueous inks to be used in the ink jet recording method is typically the order of black, cyan, magenta and yellow sequentially from the smallest to the largest.

(Specific Gravity)

It is preferable that a specific gravity $d_1$ of the first ink and a specific gravity $d_2$ of the second ink satisfy the relationship of $d_1 \geq d_2$. In the case where the recording head is arranged so as to eject an ink downward from the ejection orifice array, ink color mixing occurs when the first ink reaches the ejection orifice of the second ink and then moves in a direction opposite to the gravity to the inside of the ejection orifice of the second ink. Here, when the specific gravity $d_1$ of the first ink is lower than the specific gravity $d_2$ of the second ink, the first ink is liable to relatively move in the direction opposite to the gravity, and hence the first ink is liable to enter the inside of the ejection orifice to accelerate color mixing. In contrast, in the case where the specific gravity $d_1$ of the first ink is higher than the specific gravity $d_2$ of the second ink, even when the first ink reaches the ejection orifice of the second ink, color mixing due to the movement of the first ink to the inside of the ejection orifice of the second ink can be further suppressed. The specific gravity of the ink may be measured with a floating or vibrating type specific gravity meter.

EXAMPLES

The present invention is described in more detail below by way of Examples and Comparative Examples. The present invention is by no means limited to Examples below without departing from the gist of the present invention. "Part(s)" and "%" with regard to the description of the amounts of components are by mass unless otherwise stated.

<Preparation of Resin>

(Resin Dispersant)

A styrene-ethyl acrylate-acrylic acid copolymer (water-soluble resin) having an acid value of 150 mgKOH/g and a weight-average molecular weight of 8,000 to be used as a resin dispersant was prepared. 20.0 Parts of the resin was neutralized with potassium hydroxide in an equimolar amount to its acid value, and pure water in an appropriate amount was added thereto. Thus, an aqueous solution of a resin dispersant having a resin content (solid content) of 20.00% was prepared.

(Resin Particles 1 to 3)

1,160 Milliliters of water was heated to 90° C. in a reaction vessel. In addition, 1.39 g of potassium persulfate serving as a polymerization initiator was mixed with 160 mL of water to prepare an initiator solution. 32 Milliliters of the prepared initiator solution was added to the reaction vessel, followed by stirring. Separately, monomers whose kinds and usage amounts (g) were shown in Table 1, 1.6 g of isooctyl thioglycolate serving as a chain transfer agent and 9.98 g of a 30% aqueous solution of an emulsifier were mixed with 159.4 mL of water to prepare a monomer mixed liquid. A product available under the product name "Rhodafac RS 710" (manufactured by Rhodia Novecare) was used as the emulsifier. The prepared monomer mixed liquid was dropped into the reaction vessel over 30 minutes, and simultaneously, 129.4 g of the initiator solution was dropped into the reaction vessel over 30 minutes, followed by stirring. The resultant reaction product was stirred and maintained at 90° C. for 3 hours. After the resultant was cooled to 50° C., a 50% potassium hydroxide aqueous solution was added thereto to adjust the pH to 8.5. The contents were cooled to an ambient temperature and then filtered through a 200-mesh filter. Deionized water was added to the resultant. Thus, dispersion liquids of resin particles 1 to 3 (resin content: 30.00%) were obtained. The composition of the resin particle in each of the resultant dispersion liquids is shown in Table 1. The meanings of monomer abbreviations in Table 1 are described below.

αMSt: α-methylstyrene
St: styrene
BzA: benzyl acrylate
MAA: methacrylic acid (Glass Transition Temperature)

2 Milligrams of a resin particle obtained by evaporating a liquid containing the resin particle to dryness at 60° C. was placed and sealed in an aluminum container to prepare a sample for measurement. The prepared sample was thermally analyzed in accordance with a temperature program described below with a differential scanning calorimeter (product name "Q1000", manufactured by TA Instruments, Inc.). Thus, a temperature increase curve was created. The temperature at an intersection of a straight line extending to a high temperature side through two points in the curve on a low temperature side and a tangent line drawn at a point at which the gradient of a staircase-like change portion in the curve reaches the maximum in the created temperature increase curve (horizontal axis: temperature, vertical axis: heat quantity) was defined as a "glass transition temperature (Tg) of a resin (particle)". The Tg of each of the resin particles 1 to 3 is shown in Table 1.

[Temperature Program]:

(1) Temperature increase to 200° C. at 10° C./min (2) Temperature decrease from 200° C. to −50° C. at 5° C./min (3) Temperature increase from −50° C. to 200° C. at 10° C./min

TABLE 1

| Synthesis condition and characteristic of resin particle | | | | | |
|---|---|---|---|---|---|
| Resin | Usage amount of monomer (g) | | | | Glass transition temperature Tg |
| particle | αMSt | St | BzA | MAA | (° C.) |
| 1 | 183.0 | | 80.0 | 1.5 | 150 |
| 2 | | 150.0 | 80.0 | 1.5 | 63 |
| 3 | | 130.0 | 80.0 | 1.5 | 60 |

(Urethane Resin)

A four-necked flask including a temperature gauge, a stirring machine, a nitrogen-introducing tube and a reflux tube was prepared. 29 Parts of isophorone diisocyanate, 39 parts of polypropylene glycol having a number-average molecular weight of 2,000, 12 parts of dimethylol propionic acid, 0.02 part of dibutyltin dilaurate and 120 parts of methyl ethyl ketone were loaded into the flask. Then, the contents were caused to react with each other under a nitrogen gas atmosphere at 80° C. for 6 hours. After that, an appropriate amount of methanol was added thereto, and the contents were caused to react with each other at 80° C. until a weight-average molecular weight of 12,000 was achieved. After the reaction, the resultant was cooled to 40° C., and ion-exchanged water was added thereto. While the mixture was stirred with a homomixer at a high speed, a potassium hydroxide aqueous solution was added thereto. Methyl ethyl ketone was evaporated from the resultant resin solution by heating under reduced pressure. Thus, an aqueous solution of a urethane resin having a resin content (solid content) of 20.00% was prepared.

<Preparation of Pigment Dispersion Liquid>

(Pigment Dispersion Liquid 1)

10.0 Parts of a pigment (C.I. Pigment Blue 15:3), 15.0 parts of the previously prepared aqueous solution of the resin dispersant and 75.0 parts of pure water were mixed to provide a mixture. The resultant mixture and 200 parts of zirconia beads each having a diameter of 0.3 mm were loaded into a batch-type vertical sand mill (manufactured by Aimex Co., Ltd.), and the mixture was dispersed for 5 hours while being cooled with water. After that, the resultant was centrifuged so that a coarse particle was removed. The residue was filtered with a cellulose acetate filter having a pore size of 3.0 μm (manufactured by Advantec) under pressure. Thus, a pigment dispersion liquid 1 having a pigment content of 10.00% and a resin dispersant (resin) content of 3.00% was prepared.

(Pigment Dispersion Liquid 2)

1.6 Grams of 4-amino-1,2-benzenedicarboxylic acid was added to a solution obtained by dissolving 5.0 g of concentrated hydrochloric acid in 5.5 g of water at a temperature of 5° C. In order to maintain the temperature at 10° C. or less, a solution obtained by dissolving 1.8 g of sodium nitrite in 9.0 g of water was added to the solution obtained above under stirring in an ice bath. After the mixed solution was stirred for 15 minutes, 6.0 g of carbon black having a specific surface area of 220 mS/g and a DBP oil absorption of 105 mL/100 g was added to be mixed with the resultant. Further, after the mixture was stirred for 15 minutes, the resultant slurry was filtered through a paper filter (standard paper filter No. 2, manufactured by Advantec Toyo Kaisha, Ltd.), and the carbon black was thoroughly washed with water, followed by drying in an oven at a temperature of 110° C. Water was added to the resultant carbon black to provide a pigment dispersion liquid (pigment content: 10.00%) in a state in which a self-dispersible pigment having α-$C_6H_3$—$(COONa)_2$ group bonded to the particle surface of the carbon black was dispersed in water. After that, a sodium ion in the pigment dispersion liquid was substituted with a potassium ion by an ion exchange method. Thus, a pigment dispersion liquid 2 was obtained.

(Pigment Dispersion Liquid 3)

A pigment dispersion liquid 3 having a pigment content of 10.00% was prepared by adding an appropriate amount of ion-exchanged water to a commercially available pigment dispersion liquid (product name "CAB-O-JET 250C", manufactured by Cabot Corporation). A pigment in the pigment dispersion liquid 3 is a self-dispersible pigment in which a sulfonic acid group is bonded to a particle surface of a pigment (C.I. Pigment Blue 15:4) via a benzene ring.

(Pigment Dispersion Liquid 4)

A pigment dispersion liquid 4 having a pigment content of 10.00% and a resin dispersant (resin) content of 3.00% was obtained by the same procedure as that of the above-mentioned pigment dispersion liquid 1 except that the kind of the pigment was changed to carbon black (specific surface area: 220 $m^2/g$, DBP oil absorption: 105 mL/100 g).

(Pigment Dispersion Liquid 5)

A pigment dispersion liquid 5 having a pigment content of 10.00% and a resin dispersant (resin) content of 3.00% was obtained by the same procedure as that of the above-mentioned pigment dispersion liquid 1 except that the kind of the pigment was changed to C.I. Pigment Red 122.

(Pigment Dispersion Liquid 6)

A pigment dispersion liquid 6 having a pigment content of 10.00% and a resin dispersant (resin) content of 3.00% was obtained by the same procedure as that of the above-mentioned pigment dispersion liquid 1 except that the kind of the pigment was changed to C.I. Pigment Yellow 74.

<Preparation of Ink>

Inks were each prepared by mixing and sufficiently stirring the components (unit: %) shown in upper columns of Table 2 (Table 2-1 and Table 2-2), followed by filtration with a cellulose acetate filter having a pore size of 3.0 μm (manufactured by Advantec) under pressure. The terms "ACETYLENOL E60", "ACETYLENOL E100" and "ACETYLENOL E40" represent the product names of surfactants manufactured by Kawaken Fine Chemicals Co., Ltd., and these products have values of "x+y" in the general formula (1) of "6", "10" and "4", respectively. The term "Zonyl FS-3100" represents the product name of a fluorine-based nonionic surfactant manufactured by DuPont. The static surface tension (mN/m) and specific gravity of the ink are shown in lower columns of Table 2. The static surface tension of the ink was measured under the condition of 25° C. with an automatic surface tension meter (product name "Model CBVP-Z", manufactured by Kyowa Interface Science Co., Ltd.). The specific gravity of the ink was measured with a digital specific gravity meter (product name "Portable Density Meter DMA35", manufactured by Anton Paar GmbH) based on a vibrating type measurement method.

TABLE 2-1

| Composition and characteristics of ink | | | | | | | | | | |
|---|---|---|---|---|---|---|---|---|---|---|
| | Cyan ink | | | | | | | | | |
| | C1 | C2 | C3 | C4 | C5 | C6 | C7 | C8 | C9 | C10 |
| Pigment dispersion liquid 1 | 50.00 | 50.00 | | 50.00 | 50.00 | 50.00 | 50.00 | 50.00 | 50.00 | 50.00 |
| Pigment dispersion liquid 2 | | | | | | | | | | |
| Pigment dispersion liquid 3 | | | 50.00 | | | | | | | |
| Pigment dispersion liquid 4 | | | | | | | | | | |
| Pigment dispersion liquid 5 | | | | | | | | | | |
| Pigment dispersion liquid 6 | | | | | | | | | | |
| Water dispersion liquid of resin particle 1 | 10.00 | 10.00 | 10.00 | 10.00 | 10.00 | 10.00 | 10.00 | | | |
| Water dispersion liquid of resin particle 2 | | | | | | | | | 10.00 | |
| Water dispersion liquid of resin particle 3 | | | | | | | | | | 10.00 |
| Aqueous solution of water-soluble resin | | | | 5.00 | | | | | | |
| Glycerin | 10.71 | 10.71 | 10.80 | 10.71 | 10.71 | 10.71 | 10.71 | 12.85 | 10.71 | 10.71 |
| Triethylene glycol | 10.00 | 10.00 | 10.00 | 10.00 | 10.00 | 10.00 | 10.00 | 10.00 | 10.00 | 10.00 |
| 1,2-hexanediol | 1.00 | 1.00 | 1.00 | 1.00 | 1.00 | 1.00 | 1.00 | 1.00 | 1.00 | 1.00 |
| ACETYLENOL E60 | 0.55 | 0.75 | 0.50 | 0.55 | | | | 0.50 | 0.55 | 0.55 |
| ACETYLENOL E100 | | | | | | 0.95 | | | | |
| ACETYLENOL E40 | | | | | | | 0.25 | | | |
| Zonyl FS-3100 | | | | | 0.005 | | | | | |
| Ion-exchanged water | 17.74 | 17.54 | 17.70 | 12.74 | 18.285 | 17.34 | 18.04 | 25.65 | 17.74 | 17.74 |
| Static surface tension (mN/m) | 33 | 32 | 33 | 33 | 33 | 33 | 33 | 33 | 33 | 33 |
| Specific gravity | 1.07 | 1.07 | 1.07 | 1.07 | 1.07 | 1.07 | 1.07 | 1.07 | 1.07 | 1.07 |

TABLE 2-2

| Composition and characteristics of ink | | | | | | | | | |
|---|---|---|---|---|---|---|---|---|---|
| | Black ink | | | | | | Magenta ink | | Yellow ink |
| | K1 | K2 | K3 | K4 | K5 | K6 | M1 | M2 | Y1 |
| Pigment dispersion liquid 1 | | | | | | | | | |
| Pigment dispersion liquid 2 | 50.00 | 50.00 | | 50.00 | 50.00 | 50.00 | | | |
| Pigment dispersion liquid 3 | | | | | | | | | |
| Pigment dispersion liquid 4 | | | 50.00 | | | | | | |
| Pigment dispersion liquid 5 | | | | | | | 50.00 | 50.00 | |
| Pigment dispersion liquid 6 | | | | | | | | | 50.00 |
| Water dispersion liquid of resin particle 1 | 10.00 | 10.00 | 10.00 | 10.00 | 10.00 | | 10.00 | 10.00 | 10.00 |
| Water dispersion liquid of resin particle 2 | | | | | | | | | |
| Water dispersion liquid of resin particle 3 | | | | | | | | | |
| Aqueous solution of water-soluble resin | | | | | | | | | |
| Glycerin | 9.28 | 9.28 | 9.10 | 5.71 | 12.85 | 7.50 | 11.00 | 11.00 | 11.00 |
| Triethylene glycol | 10.00 | 10.00 | 10.00 | 10.00 | 10.00 | 10.00 | 10.00 | 10.00 | 10.00 |
| 1,2-hexanediol | 1.00 | 1.00 | 1.00 | 1.00 | 1.00 | 1.00 | 1.00 | 1.00 | 1.00 |
| ACETYLENOL E60 | 0.60 | 0.40 | 0.75 | 0.60 | 0.60 | | 0.55 | 0.75 | 0.55 |
| ACETYLENOL E100 | | | | | | | | | |
| ACETYLENOL E40 | | | | | | | | | |

TABLE 2-2-continued

| Composition and characteristics of ink | | | | | | | | | |
|---|---|---|---|---|---|---|---|---|---|
| | Black ink | | | | | | Magenta ink | | Yellow ink |
| | K1 | K2 | K3 | K4 | K5 | K6 | M1 | M2 | Y1 |
| Zonyl FS-3100 | | | | | | 0.003 | | | |
| Ion-exchanged water | 19.12 | 19.32 | 19.15 | 22.69 | 15.55 | 31.497 | 17.45 | 17.25 | 17.45 |
| Static surface tension (mN/m) | 32 | 33 | 32 | 32 | 32 | 33 | 33 | 32 | 33 |
| Specific gravity | 1.07 | 1.07 | 1.07 | 1.06 | 1.08 | 1.06 | 1.07 | 1.07 | 1.07 |

<Evaluation>

An ink jet recording apparatus including a main portion illustrated in each of FIG. 2, FIG. 3A and FIG. 3B was used, the ink is loaded into an ink cartridge illustrated in each of FIG. 3A and FIG. 3B, and the following evaluations were performed under an environment at a temperature of 25° C. and a relative humidity of 50%. A recording head of a serial type having the configuration illustrated in FIG. 4 (circulation serial head) was used as a recording head. The recording head includes, per ejection orifice, a first flow path and a second flow path communicating to each other between the ejection orifice and an ejection element, and is configured to flow the ink in the first flow path into the second flow path through utilization of a pump. The number of ejection orifices per ejection orifice array is 256, an ejection orifice density is 600 dpi and an ink ejection amount per ejection orifice is 8 ng. A ruled line to be recorded in each of the following evaluations was recorded by using two ejection orifice arrays under such conditions that one ink droplet was applied from each of the ejection orifice arrays to a region measuring 1/600 inch by 1/600 inch. An image was recorded under the conditions shown in Table 3 (Tables 3-1-1, 3-1-2, 3-2-1, 3-2-2, 3-3-1 and 3-3-2) for inks (ink set of a first ink and a second ink) and ejection orifice arrays (reference numerals in FIG. 4) having been used. In addition, the image was recorded under the conditions shown in Table 3 for the presence or absence of a flow step (circulation flow) in the recording head, the flow speed of the ink, a scanning type, a scanning speed, a distance between the ejection orifice arrays and the presence or absence of warming of the ink in the recording head. The warming of the ink in the recording head was performed so that the temperature of the ink reached 60° C. In addition, a preliminary ejection operation of the recording head outside the region of a recording medium was not performed. Further, the recording medium to which the ink had been applied was not subjected to a heating step.

(Ruled Line Distortion)

Figure 10:
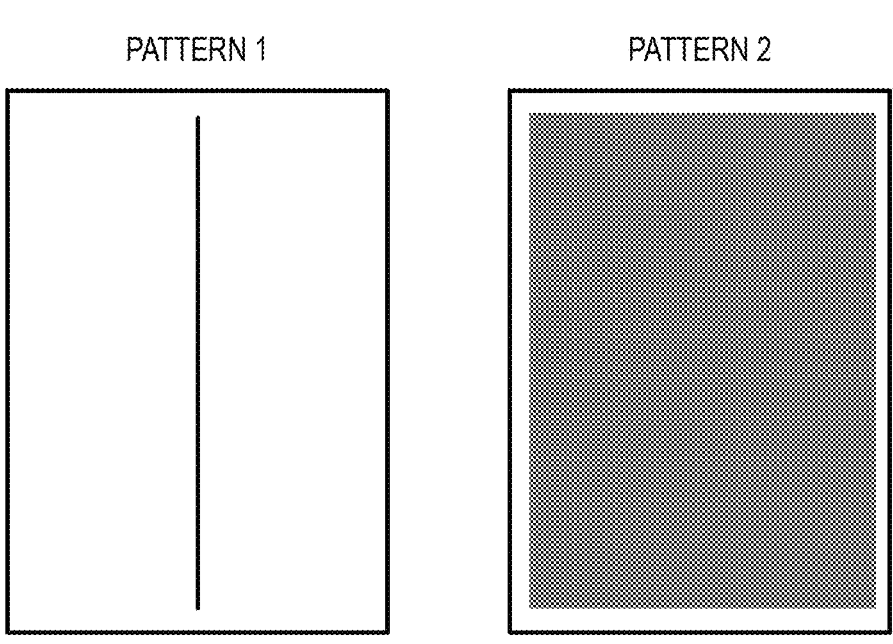
FIG. 10 is a schematic view for illustrating patterns of images recorded in Examples.

The above-mentioned ink jet recording apparatus was used to reciprocally scan the recording head, to thereby record "Pattern 1" with a ruled line having a length of 25 cm in the same direction as the ejection orifice arrangement direction in a center portion of a recording medium illustrated in FIG. 10 continuously on ten sheets by single pass through use of the first ink. A product available under the product name "High Grade Exclusive Paper HR-101SA4" (manufactured by Canon Inc.) was used as the recording medium. The recorded ruled lines were visually checked, and ruled line distortion was evaluated as image quality due to a ruled line shift in accordance with evaluation criteria described below. In the present invention, levels "A" and "B" were defined as acceptable levels, and a level "C" was defined as an unacceptable level in the evaluation criteria described below. The results are shown in Table 3.

A: There was no distortion in any of the ruled lines on the ten sheets.

B: Ruled line distortion was recognized on one or two of the ten sheets.

C: Ruled line distortion was recognized on three or more of the ten sheets.

(Color Mixing)

In this Example, a solid image recorded under such a condition that two ink droplets having a mass per drop of 8 ng is applied to a region measuring 1/600 inch by 1/600 inch is defined as a recording duty of 100%. A monochromatic solid image having a recording duty of 100% was recorded through use of the second ink. The resultant image was defined as an image 1 for evaluation. After that, the ejection orifice surface was wiped once. Then, a solid image of a secondary color (Pattern 2 illustrated in FIG. 10) was recorded continuously on 20 sheets so that the total recording duty was 100% with each ink having a recording duty of 50% through use of the first ink and the second ink, and then the recording was paused for 1 minute. After a series of operations including wiping, continuous recording, and pausing was repeated a predetermined number of times, a monochromatic solid image having a recording duty of 100% was recorded again through use of the second ink to provide an image 2 for evaluation. A4-size plain paper (product name "CS-068", manufactured Canon Inc.) was used as the recording medium, and the solid image of Pattern 2 was recorded with a margin of 2 cm on the periphery of the A4-size recording medium.

A method for the above-mentioned wiping was performed as described below. In each of Examples 1 to 11, 14 to 21, Comparative Examples 1 to 4 and Reference Example 1, the wiping was performed by a system of wiping involving moving a blade-shaped wiper made of a urethane resin in a direction parallel to the arrangement direction of the ejection orifice arrays. In Example 12, the wiping was performed by a system involving pressing a nonwoven fabric against the ejection orifice surface to cause the nonwoven fabric to absorb an ink. In Example 13, the wiping was performed by a system of wiping involving moving a blade-shaped wiper made of a urethane resin in a direction perpendicular to the arrangement direction of the ejection orifice arrays.

The image 1 for evaluation and the image 2 for evaluation were visually observed to evaluate whether or not a change in color tone due to color mixing was able to be recognized in the image 2 for evaluation in accordance with evaluation criteria described below. In the present invention, levels "A" and "B" were defined as acceptable levels, and levels "C" and "D" were defined as unacceptable levels. The results are shown in Table 3.

A: No color mixing occurred in the image 2 for evaluation even when a series of operations was repeated 800 times.

B: Color mixing occurred in the image 2 for evaluation when a series of operations was repeated 600 times or more to less than 800 times.

C: Color mixing occurred in the image 2 for evaluation when a series of operations was repeated 400 times or more to less than 600 times.

D: Color mixing occurred in the image 2 for evaluation when a series of operations was repeated less than 400 times.

TABLE 3-1-1

| | | Evaluation conditions | | | | | |
|---|---|---|---|---|---|---|---|
| | | First ink | | Second ink | | | |
| | | Kind of ink | Ejection orifice array | Kind of ink | Ejection orifice array | Relationship between $\gamma s_1$ and $\gamma s_2$ | Relationship between $d_1$ and $d_2$ |
| Example | 1 | C1 | 24 | K1 | 23 | $\gamma s_1 > \gamma s_2$ | $d_1 = d_2$ |
| | 2 | C1 | 24 | K2 | 23 | $\gamma s_1 = \gamma s_2$ | $d_1 = d_2$ |
| | 3 | M1 | 24 | K1 | 23 | $\gamma s_1 > \gamma s_2$ | $d_1 = d_2$ |
| | 4 | Y1 | 24 | K1 | 23 | $\gamma s_1 > \gamma s_2$ | $d_1 = d_2$ |
| | 5 | M1 | 24 | C2 | 23 | $\gamma s_1 > \gamma s_2$ | $d_1 = d_2$ |
| | 6 | Y1 | 24 | C2 | 23 | $\gamma s_1 > \gamma s_2$ | $d_1 = d_2$ |
| | 7 | Y1 | 24 | M2 | 23 | $\gamma s_1 > \gamma s_2$ | $d_1 = d_2$ |
| | 8 | C3 | 24 | K3 | 23 | $\gamma s_1 > \gamma s_2$ | $d_1 = d_2$ |
| | 9 | C3 | 24 | K1 | 23 | $\gamma s_1 > \gamma s_2$ | $d_1 = d_2$ |
| | 10 | C1 | 24 | K3 | 23 | $\gamma s_1 > \gamma s_2$ | $d_1 = d_2$ |
| | 11 | C4 | 24 | K1 | 23 | $\gamma s_1 > \gamma s_2$ | $d_1 = d_2$ |
| | 12 | C5 | 24 | K1 | 23 | $\gamma s_1 > \gamma s_2$ | $d_1 = d_2$ |
| | 13 | C6 | 24 | K1 | 23 | $\gamma s_1 > \gamma s_2$ | $d_1 = d_2$ |
| | 14 | C7 | 24 | K1 | 23 | $\gamma s_1 > \gamma s_2$ | $d_1 = d_2$ |
| | 15 | C8 | 24 | K1 | 23 | $\gamma s_1 > \gamma s_2$ | $d_1 = d_2$ |
| | 16 | C9 | 24 | K1 | 23 | $\gamma s_1 > \gamma s_2$ | $d_1 = d_2$ |
| | 17 | C10 | 24 | K1 | 23 | $\gamma s_1 > \gamma s_2$ | $d_1 = d_2$ |
| | 18 | K2 | 24 | C2 | 23 | $\gamma s_1 > \gamma s_2$ | $d_1 = d_2$ |
| | 19 | C1 | 24 | K4 | 23 | $\gamma s_1 > \gamma s_2$ | $d_1 > d_2$ |
| | 20 | C1 | 24 | K5 | 23 | $\gamma s_1 > \gamma s_2$ | $d_1 < d_2$ |
| | 21 | C1 | 24 | K1 | 23 | $\gamma s_1 > \gamma s_2$ | $d_1 = d_2$ |
| | 22 | C1 | 24 | K1 | 23 | $\gamma s_1 > \gamma s_2$ | $d_1 = d_2$ |
| | 23 | C1 | 24 | K1 | 23 | $\gamma s_1 > \gamma s_2$ | $d_1 = d_2$ |
| | 24 | C1 | 24 | K1 | 23 | $\gamma s_1 > \gamma s_2$ | $d_1 = d_2$ |
| | 25 | C1 | 24 | K1 | 23 | $\gamma s_1 > \gamma s_2$ | $d_1 = d_2$ |
| | 26 | C1 | 24 | K1 | 23 | $\gamma s_1 > \gamma s_2$ | $d_1 = d_2$ |
| | 27 | C1 | 24 | K1 | 23 | $\gamma s_1 > \gamma s_2$ | $d_1 = d_2$ |
| | 28 | C1 | 24 | K1 | 23 | $\gamma s_1 > \gamma s_2$ | $d_1 = d_2$ |
| | 29 | C1 | 24 | K1 | 23 | $\gamma s_1 > \gamma s_2$ | $d_1 = d_2$ |
| | 30 | C1 | 24 | K1 | 22 | $\gamma s_1 > \gamma s_2$ | $d_1 = d_2$ |
| | 31 | C1 | 24 | K1 | 22 | $\gamma s_1 > \gamma s_2$ | $d_1 = d_2$ |
| | 32 | C1 | 24 | K1 | 21 | $\gamma s_1 > \gamma s_2$ | $d_1 = d_2$ |
| | 33 | K6 | 24 | C2 | 23 | $\gamma s_1 > \gamma s_2$ | $d_1 < d_2$ |

TABLE 3-1-2

| | | Evaluation conditions | | | | | |
|---|---|---|---|---|---|---|---|
| | | First ink | | Second ink | | | |
| | | Kind of ink | Ejection orifice array | Kind of ink | Ejection orifice array | Relationship between $\gamma s_1$ and $\gamma s_2$ | Relationship between $d_1$ and $d_2$ |
| Comparative Example | 1 | C2 | 24 | K2 | 23 | $\gamma s_1 < \gamma s_2$ | $d_1 = d_2$ |
| | 2 | C1 | 24 | K1 | 23 | $\gamma s_1 > \gamma s_2$ | $d_1 = d_2$ |
| | 3 | C1 | 24 | K1 | 23 | $\gamma s_1 > \gamma s_2$ | $d_1 = d_2$ |
| | 4 | C1 | 24 | K2 | 23 | $\gamma s_1 = \gamma s_2$ | $d_1 = d_2$ |
| | 5 | C2 | 24 | K2 | 23 | $\gamma s_1 < \gamma s_2$ | $d_1 = d_2$ |
| | 6 | C2 | 24 | K2 | 21 | $\gamma s_1 < \gamma s_2$ | $d_1 = d_2$ |
| Reference Example | 1 | C1 | — | K1 | — | $\gamma s_1 > \gamma s_2$ | $d_1 = d_2$ |

TABLE 3-2-1

| Evaluation conditions | | | | | | | |
|---|---|---|---|---|---|---|---|
| | | Evaluation conditions Recording head | | | | | |
| | | Flow step (circulation flow) | Flow speed (mm/s) | Scanning type | Scanning speed (inches/sec) | Distance between ejection orifice arrays (mm) | Warming of ink |
| Example | 1 | Present | 10.0 | Serial | 40 | 0.7 | Present |
| | 2 | Present | 10.0 | Serial | 40 | 0.7 | Present |
| | 3 | Present | 10.0 | Serial | 40 | 0.7 | Present |
| | 4 | Present | 10.0 | Serial | 40 | 0.7 | Present |
| | 5 | Present | 10.0 | Serial | 40 | 0.7 | Present |
| | 6 | Present | 10.0 | Serial | 40 | 0.7 | Present |
| | 7 | Present | 10.0 | Serial | 40 | 0.7 | Present |
| | 8 | Present | 10.0 | Serial | 40 | 0.7 | Present |
| | 9 | Present | 10.0 | Serial | 40 | 0.7 | Present |
| | 10 | Present | 10.0 | Serial | 40 | 0.7 | Present |
| | 11 | Present | 10.0 | Serial | 40 | 0.7 | Present |
| | 12 | Present | 10.0 | Serial | 40 | 0.7 | Present |
| | 13 | Present | 10.0 | Serial | 40 | 0.7 | Present |
| | 14 | Present | 10.0 | Serial | 40 | 0.7 | Present |
| | 15 | Present | 10.0 | Serial | 40 | 0.7 | Present |
| | 16 | Present | 10.0 | Serial | 40 | 0.7 | Present |
| | 17 | Present | 10.0 | Serial | 40 | 0.7 | Present |
| | 18 | Present | 10.0 | Serial | 40 | 0.7 | Present |
| | 19 | Present | 10.0 | Serial | 40 | 0.7 | Present |
| | 20 | Present | 10.0 | Serial | 40 | 0.7 | Present |
| | 21 | Present | 10.0 | Serial | 40 | 0.7 | Present |
| | 22 | Present | 10.0 | Serial | 40 | 0.7 | Present |
| | 23 | Present | 10.0 | Serial | 30 | 0.7 | Present |
| | 24 | Present | 10.0 | Serial | 70 | 0.7 | Present |
| | 25 | Present | 10.0 | Serial | 80 | 0.7 | Present |
| | 26 | Present | 0.5 | Serial | 40 | 0.7 | Present |
| | 27 | Present | 1.0 | Serial | 40 | 0.7 | Present |
| | 28 | Present | 100.0 | Serial | 40 | 0.7 | Present |
| | 29 | Present | 120.0 | Serial | 40 | 0.7 | Present |
| | 30 | Present | 10.0 | Serial | 40 | 0.1 | Present |
| | 31 | Present | 10.0 | Serial | 40 | 1.8 | Present |
| | 32 | Present | 10.0 | Serial | 40 | 2.5 | Present |
| | 33 | Present | 120.0 | Serial | 80 | 1.8 | Present |

TABLE 3-2-2

| Evaluation conditions | | | | | | | |
|---|---|---|---|---|---|---|---|
| | | Evaluation conditions Recording head | | | | | |
| | | Flow step (circulation flow) | Flow speed (mm/s) | Scanning type | Scanning speed (inches/sec) | Distance between ejection orifice arrays (mm) | Warming of ink |
| Comparative Example | 1 | Present | 10.0 | Serial | 40 | 0.7 | Present |
| | 2 | Absent | — | Serial | 40 | 0.7 | Present |
| | 3 | Present | 10.0 | Serial | 40 | 0.7 | Absent |
| | 4 | Present | 10.0 | Serial | 40 | 0.7 | Absent |
| | 5 | Present | 10.0 | Serial | 40 | 0.7 | Absent |
| | 6 | Present | 10.0 | Serial | 40 | 2.5 | Present |
| Reference Example | 1 | Present | 10.0 | Line | — | 0.7 | Present |

TABLE 3-3-1

| Evaluation conditions and evaluation results | | | | |
|---|---|---|---|---|
| | | | Evaluation results | |
| | | Evaluation conditions Wiping | Ruled line distortion | Color mixing |
| Example | 1 | Parallel direction | A | A |
| | 2 | Parallel direction | A | A |
| | 3 | Parallel direction | A | A |
| | 4 | Parallel direction | A | A |
| | 5 | Parallel direction | A | A |
| | 6 | Parallel direction | A | A |
| | 7 | Parallel direction | A | A |
| | 8 | Parallel direction | A | A |
| | 9 | Parallel direction | A | A |
| | 10 | Parallel direction | A | A |
| | 11 | Parallel direction | A | A |
| | 12 | Parallel direction | A | B |
| | 13 | Parallel direction | A | A |
| | 14 | Parallel direction | A | A |
| | 15 | Parallel direction | A | B |
| | 16 | Parallel direction | A | A |
| | 17 | Parallel direction | A | B |
| | 18 | Parallel direction | A | B |
| | 19 | Parallel direction | A | A |
| | 20 | Parallel direction | A | B |
| | 21 | Nonwoven fabric | A | A |
| | 22 | Perpendicular direction | A | B |
| | 23 | Parallel direction | A | A |
| | 24 | Parallel direction | A | A |
| | 25 | Parallel direction | A | B |
| | 26 | Parallel direction | B | A |
| | 27 | Parallel direction | A | A |
| | 28 | Parallel direction | A | A |
| | 29 | Parallel direction | A | B |
| | 30 | Parallel direction | A | A |
| | 31 | Parallel direction | A | A |
| | 32 | Parallel direction | A | A |
| | 33 | Perpendicular direction | B | B |

TABLE 3-3-2

| Evaluation conditions and evaluation results | | | | |
|---|---|---|---|---|
| | | | Evaluation results | |
| | | Evaluation conditions Wiping | Ruled line distortion | Color mixing |
| Comparative Example | 1 | Parallel direction | A | D |
| | 2 | Parallel direction | C | A |
| | 3 | Parallel direction | C | A |
| | 4 | Parallel direction | C | A |
| | 5 | Parallel direction | C | A |
| | 6 | Parallel direction | A | C |
| Reference Example | 1 | Parallel direction | A | A |

In each of Comparative Examples 3 to 5, the ink was not warmed, and hence it is conceived that the change in color tone of an image due to ink color mixing did not occur even when the recording head was reciprocated to record an image. However, ejection stability was insufficient, and a preliminary ejection operation was required. Reference Example 1 is an example in which a recording head of a line type corresponding to the width of a recording medium was used as the recording head. In Reference Example 1, the image was recorded without reciprocation of the recording head, and hence a decrease in color tone due to color mixing did not occur. In Reference Example 1, the recording head was upsized as compared to a recording head of a serial type, and hence the recording apparatus was not able to be downsized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-096386, filed Jun. 12, 2023, and Japanese Patent Application No. 2024-079384, filed May 15, 2024 which are hereby incorporated by reference herein in their entirety.

What is claimed is:

1. An ink jet recording method comprising recording an image by ejecting an ink from a recording head including: a plurality of ejection orifices each configured to eject the ink; an ejection element configured to generate energy for ejecting the ink; and a first flow path and a second flow path which communicate to each other between each of the plurality of ejection orifices and the ejection element and inside which the ink flows, the ink jet recording method comprising:

an ejection step of ejecting the ink from the plurality of ejection orifices;

a flow step, which is separate from the ejection step, of flowing the ink in the first flow path into the second flow path; and a step of warming the ink in the recording head, wherein the recording head is a recording head of a serial type which includes an ejection element substrate including a plurality of ejection orifice arrays each having the plurality of ejection orifices arranged in a predetermined direction and which is scanned in a direction intersecting with an arrangement direction of the ejection orifice arrays, wherein the first flow path and the second flow path are arranged in parallel to a scanning direction of the recording head and have the same flow direction of the ink, wherein the plurality of ejection orifice arrays includes a first ejection orifice array configured to eject a first ink and a second ejection orifice array configured to eject a second ink, and the first ejection orifice array and the second ejection orifice array are arranged on an upstream side and on a downstream side, respectively, with respect to the flow direction of the ink, wherein a static surface tension $\gamma s_1$ of the first ink and a static surface tension $\gamma s_2$ of the second ink satisfy a relationship of $\gamma s_1 \geq \gamma s_2$, and wherein a specific gravity $d_1$ of the first ink and a specific gravity $d_2$ of the second ink satisfy a relationship of $d_1 \geq d_2$.

2. The ink jet recording method according to claim 1, wherein the first ink comprises a compound represented by the following general formula (1):

(1)

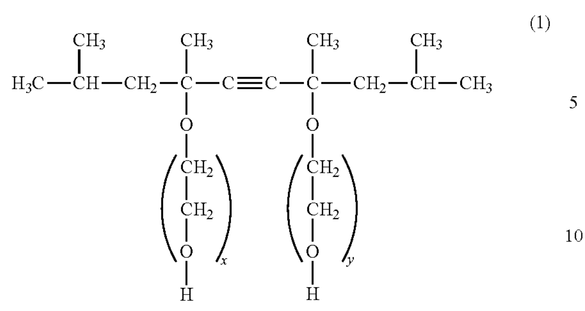

wherein, in the general formula (1), "x" and "y" each independently represent a number of 0 or more, and x+y is 0 or more to 50 or less.

3. The ink jet recording method according to claim 1, wherein the first ink comprises a resin particle having a glass transition temperature Tg higher than a warming temperature of the recording head.

4. The ink jet recording method according to claim 1, wherein the first ink has lightness higher than lightness of the second ink.

5. The ink jet recording method according to claim 1, further comprising a cleaning step of wiping an ejection orifice surface having the plurality of ejection orifice arrays arranged in a predetermined direction, wherein a system of the wiping is one of a system involving moving a wiper member in a direction parallel to the arrangement direction of the ejection orifice arrays or a system involving pressing a nonwoven fabric against the ejection orifice surface to cause the nonwoven fabric to absorb an ink.

6. The ink jet recording method according to claim 1, wherein a moving speed of the recording head during the scanning is 70 inches/sec or less.

7. The ink jet recording method according to claim 1, wherein a flow speed of the ink during the flowing is 1.0 mm/s or more to 100.0 mm/s or less.

8. The ink jet recording method according to claim 1, wherein a distance between the first ejection orifice array and the second ejection orifice array is 1.8 mm or less.

9. An ink jet recording apparatus comprising a recording head including: a plurality of ejection orifices each configured to eject an ink; an ejection element configured to generate energy for ejecting the ink; and a first flow path and a second flow path which communicate to each other between each of the plurality of ejection orifices and the ejection element and inside which the ink flows, the ink jet recording apparatus further comprising:

a flow unit, which is separate from the ejection element, configured to flow the ink in the first flow path into the second flow path; and a mechanism configured to warm the ink in the recording head, wherein the recording head is a recording head of a serial type which includes an ejection element substrate including a plurality of ejection orifice arrays each having the plurality of ejection orifices arranged in a predetermined direction and which is scanned in a direction intersecting with an arrangement direction of the ejection orifice arrays, wherein the first flow path and the second flow path are arranged in parallel to a scanning direction of the recording head and have the same flow direction of the ink, wherein the plurality of ejection orifice arrays includes a first ejection orifice array configured to eject a first ink and a second ejection orifice array configured to eject a second ink, and the first ejection orifice array and the second ejection orifice array are arranged on an upstream side and on a downstream side, respectively, with respect to the flow direction of the ink, and wherein a static surface tension $\gamma s_1$ of the first ink and a static surface tension $\gamma s_2$ of the second ink satisfy a relationship of $\gamma s_1 \geq \gamma s_2$.

10. An ink jet recording method comprising recording an image by ejecting an ink from a recording head including: a plurality of ejection orifices each configured to eject the ink; an ejection element configured to generate energy for ejecting the ink; and a first flow path and a second flow path which communicate to each other between each of the plurality of ejection orifices and the ejection element and inside which the ink flows, the ink jet recording method comprising:

an ejection step of ejecting the ink from the plurality of ejection orifices;

a flow step, which is separate from the ejection step, of flowing the ink in the first flow path into the second flow path; and a step of warming the ink in the recording head, wherein the recording head is a recording head of a serial type which includes an ejection element substrate including a plurality of ejection orifice arrays each having the plurality of ejection orifices arranged in a predetermined direction and which is scanned in a direction intersecting with an arrangement direction of the ejection orifice arrays, wherein the first flow path and the second flow path are arranged in parallel to a scanning direction of the recording head and have the same flow direction of the ink, wherein the plurality of ejection orifice arrays includes a first ejection orifice array configured to eject a first ink and a second ejection orifice array configured to eject a second ink, and the first ejection orifice array and the second ejection orifice array are arranged on an upstream side and on a downstream side, respectively, with respect to the flow direction of the ink, wherein a static surface tension $\gamma s_1$ of the first ink and a static surface tension $\gamma s_2$ of the second ink satisfy a relationship of $\gamma s_1 \geq \gamma s_2$, and wherein the first ink comprises a compound represented by the following general formula (1):

(1)

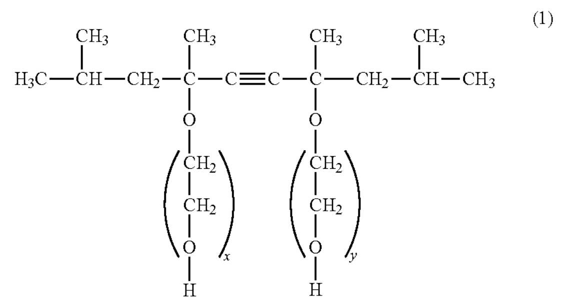

wherein, in the general formula (1), "x" and "y" each independently represent a number of 0 or more, and x+y is 0 or more to 50 or less.

* * * * *